United States Patent [19]

Helenius et al.

[11] 4,395,758

[45] Jul. 26, 1983

[54] ACCELERATOR PROCESSOR FOR A DATA PROCESSING SYSTEM

[75] Inventors: Allan Helenius, Westford; Stanley A. Lackey, Jr., Chelmsford; Thomas A. Northrup, Westford, all of Mass.

[73] Assignee: Digital Equipment Corporation, Maynard, Mass.

[21] Appl. No.: 310,826

[22] Filed: Oct. 13, 1981

Related U.S. Application Data

[63] Continuation of Ser. No. 101,700, Dec. 10, 1979, abandoned, which is a continuation of Ser. No. 954,609, Oct. 25, 1978, abandoned.

[51] Int. Cl.³ .............................................. G06F 15/16
[52] U.S. Cl. .................................................. 364/200
[58] Field of Search ............... 364/200, 900, 133, 132, 364/137

[56] References Cited

U.S. PATENT DOCUMENTS

| | | | |
|---|---|---|---|
| 3,614,740 | 10/1971 | Delagi | 364/200 |
| 3,614,741 | 10/1971 | McFarland, Jr. | 364/200 |
| 3,701,976 | 10/1972 | Shively | 364/200 |
| 3,710,324 | 1/1973 | Cohen et al. | 364/200 |
| 3,787,673 | 1/1974 | Watson | 364/200 |
| 3,871,578 | 3/1975 | Van De Goor | 364/748 |
| 3,999,163 | 12/1976 | Levy | 364/200 |
| 4,050,058 | 9/1977 | Garlic | 364/200 |
| 4,064,395 | 12/1977 | Schubeler | 364/900 |
| 4,101,960 | 7/1978 | Stokes et al. | 364/200 |
| 4,110,823 | 8/1978 | Cronshaw | 364/200 |
| 4,117,536 | 9/1978 | Bodner | 364/200 |

*Primary Examiner*—James D. Thomas
*Assistant Examiner*—David Y. Eng
*Attorney, Agent, or Firm*—Cesari and McKenna

[57] ABSTRACT

A special instruction processor that connects to a central processing unit in a data processing system. The central processing unit processes a number of instructions. Instructions involving operands first retrieve the operands from memory, from general purpose registers in the central processor or the instruction stream. These operands are transferred to the special instruction processor. If the instruction is one of a predetermined set of instructions that is executed by the special instruction processor, the special instruction processor will, upon receiving the operands, generate an overriding signal that alters the operation of the central processor unit by inhibiting its processing of the operands. Instead, the special instruction processor unit, that is specifically designed to perform the operations efficiently, computes a result. When the result has been computed and the central processor has determined the location for receiving the result, the central processing unit retrieves the result and stores it. Operations are optimized if the instruction operand specifiers designate operands that are to be found in the instruction stream or the general purpose registers.

7 Claims, 24 Drawing Figures

FIG. 2A

| BYTE 7 | BYTE 6 | BYTE 5 | BYTE 4 | BYTE 3 | BYTE 2 | BYTE 1 | BYTE 0 |

FIG. 2B

| WORD 3 | WORD 2 | WORD 1 | WORD 0 |

FIG. 2C

| LONG WORD 1 | LONG WORD 0 |

FIG. 2D

| QUAD WORD 0 |

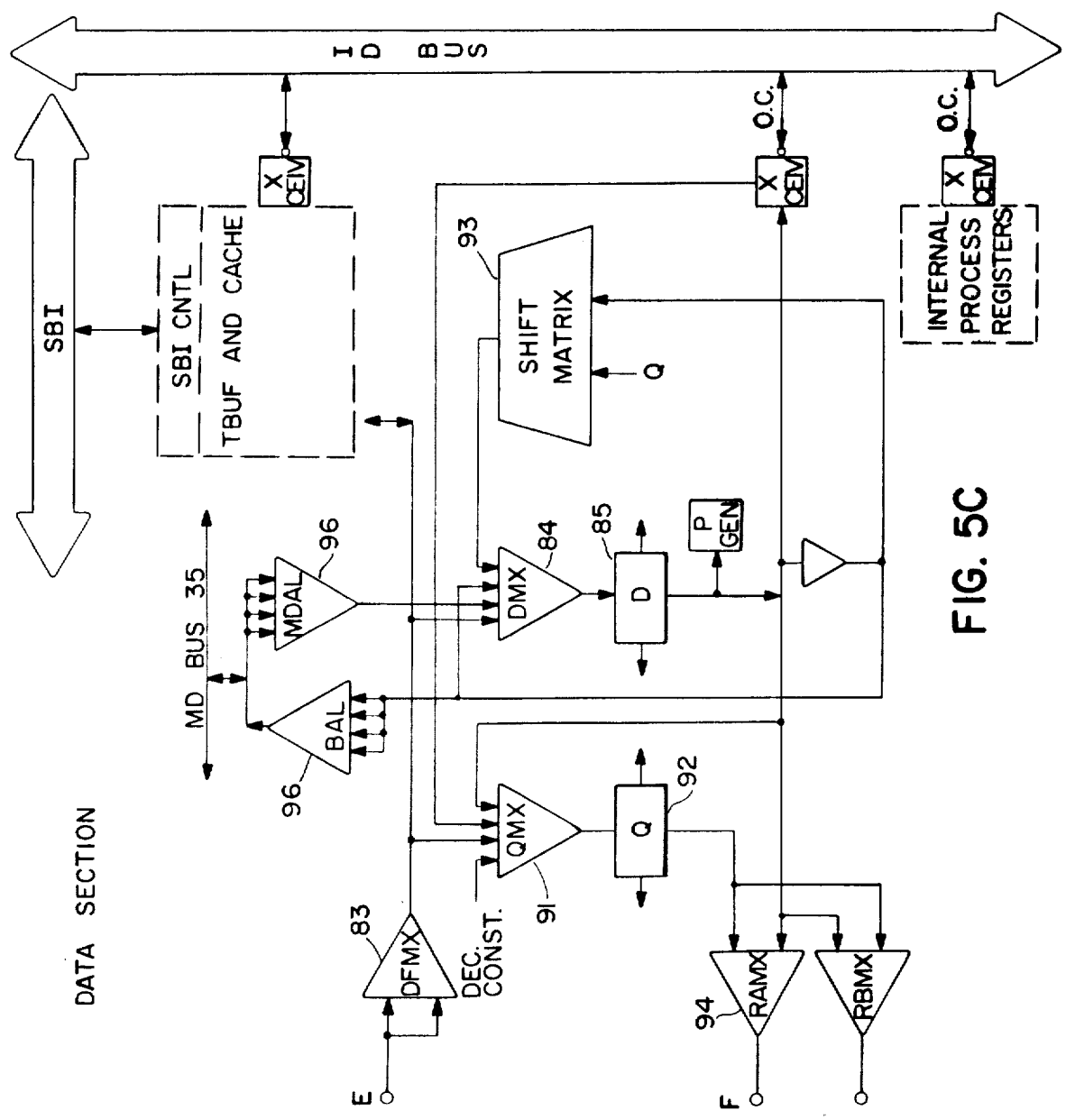

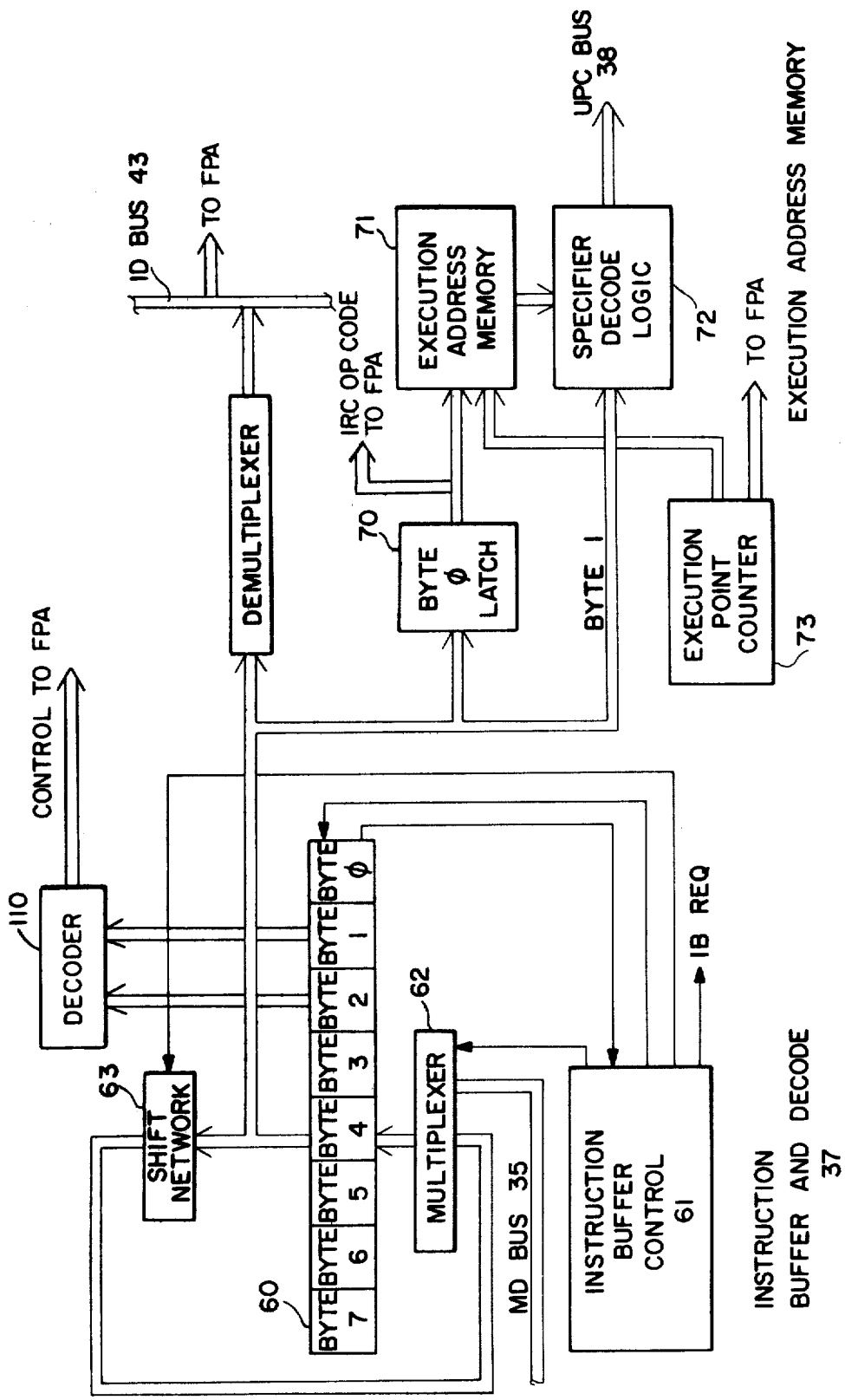

| EXECUTION ADDRESS MEMORY 71 OUTPUT SIGNALS | | |
|---|---|---|
| BIT POSITIONS | VALUES | MEANING |
| 1   0<br>TYPE | 0 0<br>0 1<br>1 0<br>1 1 | INTEGER NUMBER<br>FLOATING POINT NUMBER<br>VSRC<br>ASRC |
| 3   2<br>LENGTH | 0 0<br>0 1<br>1 0<br>1 1 | 1 BYTE<br>2 BYTES<br>4 BYTES<br>8 BYTES |
| 5   4<br>MODE | 0 0<br>0 1<br>1 0<br>1 1 | SELECT SPECIFIER<br>EXECUTE IF REGISTER<br>OPTIMIZED<br>SELECT EXECUTE |
| 7   6<br>ACCESS | 0 0<br>0 1<br>1 0<br>1 1 | BRANCH INSTRUCTION<br>READ<br>WRITE<br>MODIFY |

FIG. 6B

| SPECIFIER DECODE LOGIC 72 | | | | |
|---|---|---|---|---|
| MODE | R=PC | R≠PC | QUAD | ABORT |
| 0 | 00 | 00 | 02 | 01/08 |
| 1 | 00 | 00 | 02 | 01/03 |
| 2 | 00 | 00 | 02 | 01/03 |
| 3 | 00 | 00 | 02 | 01/03 |
| 4 | 0C | 1C | -- | 1D |
| 5 | 04 | 14 | 06, 16 | 07,17,05,15 |
| 6 | 08 | 18 | | |
| 7 | 0A | 1A | | |
| 8 | 09 | 19 | | |
| 9 | 0B | 1B | | |
| 10 | 0D | 0D | | |
| 11 | 0F | 0F | | |
| 12 | 0D | 0D | | |
| 13 | 0F | 0F | | |
| 14 | 0D | 0D | | |
| 15 | 0F | 0F | | |

FIG. 6C

ACCELERATOR PROCESSOR FOR A DATA PROCESSING SYSTEM

This is a continuation of U.S. patent application Ser. No. 101,700, filed Dec. 10, 1979 now abandoned, which in turn was a continuation of U.S. patent application Ser. No. 954,609, filed Oct. 25, 1978 now abandoned.

CROSS REFERENCE TO RELATED PATENTS AND PATENT APPLICATIONS

U.S. Pat. No. 3,614,740 issued Oct. 19, 1971 for a DATA PROCESSING SYSTEM WITH CIRCUITS FOR TRANSFERRING BETWEEN OPERATING ROUTINES, INTERRUPTION ROUTINES AND SUBROUTINES and assigned to the same assignee as the present invention.

U.S. Pat. No. 3,614,741 issued Oct. 19, 1971 for a DATA PROCESSING SYSTEM WITH INSTRUCTION ADDRESSES IDENTIFYING ONE OF A PLURALITY OF REGISTERS INCLUDING THE PROGRAM COUNTER and assigned to the same assignee as the present invention.

U.S. Pat. No. 3,710,324 issued Jan. 9, 1973 for a DATA PROCESSING SYSTEM and assigned to the same assignee as the present invention.

U.S. Pat. No. 3,999,163 issued Dec. 21, 1976 for a SECONDARY STORAGE FACILITY FOR DATA PROCESSING SYSTEM and assigned to the same assignee as the present invention.

U.S. Pat. No. 4,236,206 issued Nov. 25, 1980, for a CENTRAL PROCESSOR UNIT FOR EXECUTING INSTRUCTIONS OF VARIABLE LENGTH and assigned to the same assignee as the present invention.

U.S. Pat. No. 4,232,366 issued Nov. 4, 1980, for a BUS FOR A DATA PROCESSING SYSTEM WITH OVERLAPPED SEQUENCES and assigned to the same assignee as the present invention.

BACKGROUND OF THE INVENTION

This invention generally relates to digital data processing systems. More specifically it relates to a processor for use in such data processing systems.

A digital data processing system comprises three basic elements: namely, a memory element, an input-output element and a processor element. The memory element stores information in addressable storage locations. This information includes data and instructions for processing the data. The processor element transfers information from the memory element. It interprets the incoming information as either data or an instruction. An instruction includes an operation code that specifies, in coded form, the operation to be performed by the processor. An instruction may also include information that specifies one or more operands. The information that specifies an operand is called an operand specifier.

The various functions that a processor performs in response to the operation code code in a given instruction might be quite simple or very complex. Some of the more complex operations are found in instructions generally known as floating point instructions that perform arithmetic operations using floating point numbers. In the past different approaches have been utilized for processing floating point numbers in accordance with such instructions. In one approach the processor itself is constructed to process the floating point instructions in the same manner as other instructions. With this approach, however, the processor complexity is increased over processors that do not have that capability. In many applications the added complexity is not justified by the end use of the processor.

Another approach utilizes optional circuitry that readily connects to the processor to process the floating point instructions directly. This offers the advantage that the processor complexity need not be greatly increased in normal applications. However, it does require the added cost of the optional circuitry if any of the instructions is to be processes because the processor itself does not have the capability.

With the advent of microprocessor controlled data processing systems, it has been possible to implement floating point instructions within a processor without unduly increasing its overall cost. However, these implementations usually require significant periods of time in order to complete the processing period. While the long processing times may be acceptable when such instructions are processed only occassionally, the times can become unacceptable if such instructions are used repetitively.

Therefore, it is an object of this invention to provide a unit for processing specific types of instructions.

Still another object of this invention is to provide a unit for connection to a processor in a data processing system that utilizes the processor to obtain operands and then processes the operands.

SUMMARY

In accordance with this invention, a central processor in the data processing system has the capability of processing a number of instructions. Certain of those instructions, however, can also be processed by an special processor. The central processor decodes each instruction it retrieves from memory and retrieves operands in response to operand specifiers in the instructions. Each operand is transferred in sequence to the special processor. When all the operands have been retrieved and the instruction contains an operation codes that corresponds to one of a predetermined set of special instructions, the special processor inhibits processing by the central processor and performs the operation. Then the special processor transfers the results back to the central processor for storage in a destination storage location.

This invention is pointed out with particularity in the appended claims. The above and further objects and advantages of this invention may be better understood by referring to the following description taken in conjunction with the accompanying drawings.

BRIEF DESCRIPTION OF THE DRAWINGS

FIGS. 2A through 2D pictorially depict data types that are utilized in conjunction with a specific embodiment of this invention;

FIG. 5 and FIGS. 5A through 5C constitute a block diagram of the data paths shown in FIG. 3;

FIG. 6A is a block diagram of the instruction buffer and decode circuits shown in FIG. 3 and FIGS. 6B and 6C depict certain signals that are transmitted by the circuits shown in FIG. 6A;

FIGS. 8C-1 through 8C-3, is a flow diagram that defines the operation of the central processor shown in FIGS. 1 and 3 in response to that instruction;

DESCRIPTION OF AN ILLUSTRATIVE EMBODIMENT

A. General Discussion

Figure 1:
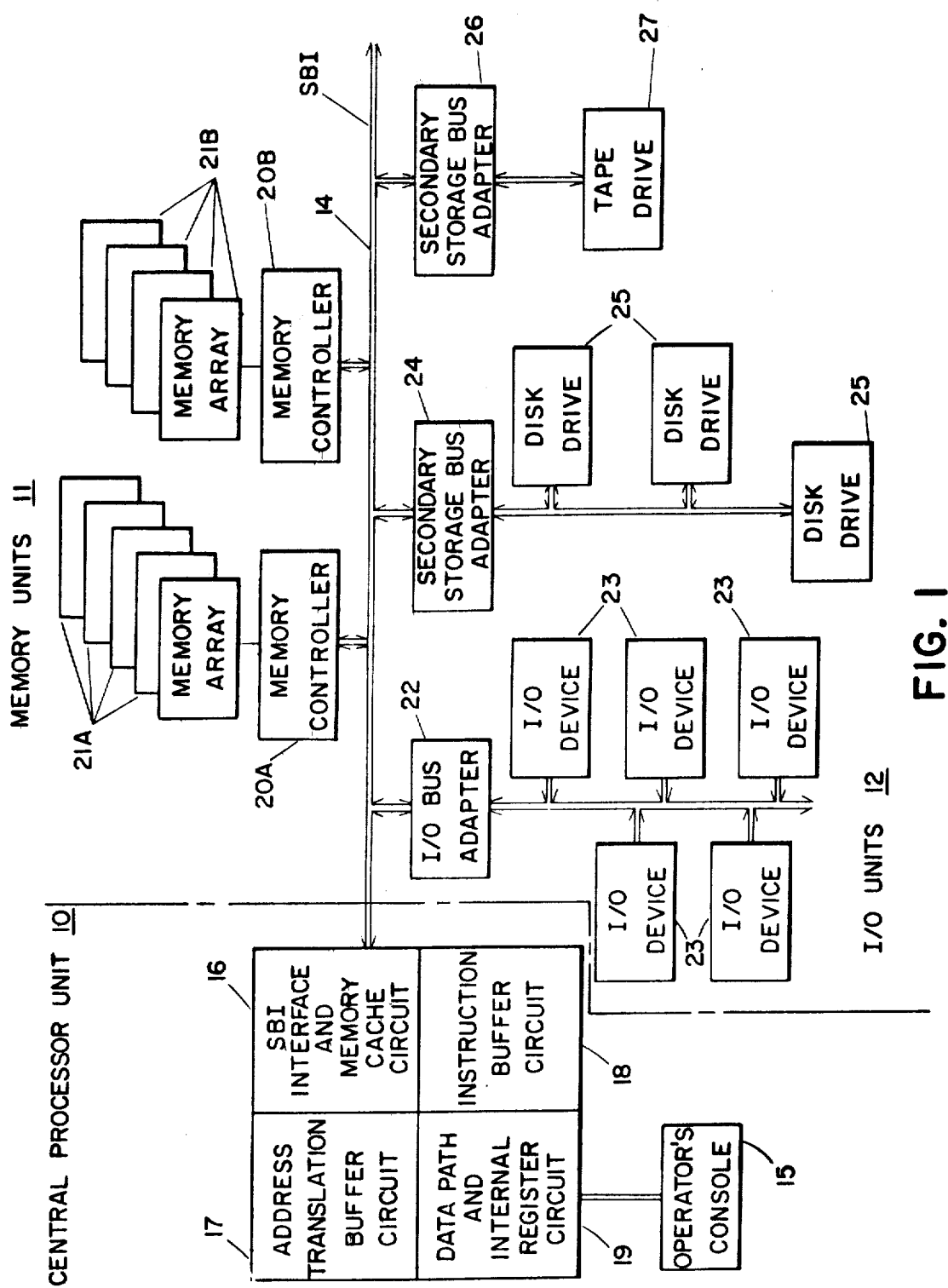
FIG. 1 is a block diagram of a digital data processing system constructed in accordance with this invention.

Referring to FIG. 1, the basic elements of a data processing system that embodies our invention comprise a central processor unit 10, memory units 11 and I/O units 12. A synchronous backplane interconnection (SBI) 14 interconnects the central processor unit 10, memory units 11 and I/O units 12.

The central processor unit 10 comprises an operator's console 15, an SBI interface and memory cache circuit 16, an address translation buffer circuit 17, an instruction buffer circuit 18 and a data path and internal register circuit 19. The SBI interface and memory cache circuit 16 provides the necessary interfacing circuitry for transferring information over the SBI 14 to the memory units 11 and I/O units 12. The circuit 16 receives all data from the memory and all address translations from the buffer circuit 17. It includes an associative memory, or cache. Anytime data is written into the cache memory in the circuit 16 from the data path and internal register circuit 19, that data is also written into a corresponding location in the memory unit 11.

This specific embodiment of the central processor 10 operates with virtual addresses. The address translation buffer circuit 17 converts the virtual addresses to physical addresses which the memory cache circuit 16 uses either to determine whether it contains data from the corresponding location or to initiate a transfer from the corresponding actual location in the memory units 11. The instruction buffer circuit 18 includes, as described later, means for storing instructions, or portions thereof, as they are retrieved either from the cache memory directly or from the memory units 11.

The operator's console 15 serves as the operator interface. It allows the operator to examine and deposit data, halt the operation of the central processor unit 10 or step it through a sequence of program instructions. It also enables an operator to initialize the system through a bootstrap procedure and perform various diagnostic procedures on the entire data processing system.

In FIG. 1, each memory unit 11 comprises two memory controllers 20A and 20B. Each memory controller connects to a plurality of memory arrays. Specifically, memory controller 20A connects to memory arrays 21A while memory controller 20B connects to memory arrays 21B. The operation of the memory unit 11 is disclosed in detail in the copending U.S. patent application Ser. No. 845,415.

Several types of I/O units 12 are shown. An I/O bus adapter 22 interconnects various input/output (I/O) devices 23, such as teletypewriters, to the bus 14. The interconnection, operation and transfer of signals between the I/O bus adapter 22 and the I/O devices 23 is disclosed in U.S. Pat. No. 3,710,324.

Two other I/O units 12 provide a secondary storage facility for the data processing system. They include a secondary storage bus adapter 24 and a plurality of disk drives 25. There is also shown a secondary storage bus adapter 26 and a tape drive 27. The interconnection of the secondary storage bus adapters 24 and 26 and their respective disk drives 25 and tape drive 27 is disclosed in the foregoing U.S. Pat. No. 3,999,163.

U.S. patent application Ser. No. 845,415 describes the interactions of the elements over the SBI 14. For purposes of the following discussion, it will be helpful to summarize these interactions and to define specific terms including the designation of the data items, or groups, which this specific embodiment of the invention can process. The basic, or most elementary, information group is a byte. This is shown in FIG. 2A and it includes eight bits in this specific embodiment of the invention. In order of increasing size, the next information group is a word, which is shown in FIG. 2B as comprising two bytes. In FIG. 2C there is depicted a "longword" that comprises two consecutive words or four consecutive bytes. FIG. 2D depicts a "quadword" which comprises two consecutive longwords, i.e., four consecutive words or eight consecutive bytes. Any transfer of information over the SBI 14 involves a longword.

The SBI 14 is time-division multiplexed and includes signal paths for carrying information and control signals. In terms of this invention, the information includes control information and data. Control information is the intelligence used to control and provide the basis for data processing whereas data is program-generated information which is the object of the processing itself.

Each unit that connects to the SBI is called a nexus. The specific system shown in FIG. 1 includes six nexuses. A nexus is defined further in terms of its function during an exchange of information. At least two SBI transactions are necessary to exchange information between two nexuses. During a first transaction, one nexus, as a transmitting commander nexus, transmits command and address information to all the nexuses. This nexus is called a transmitting nexus because it is driving the SBI 14 and a commander nexus because it has transmitted the command and address information. During this transaction all other nexuses are receiving nexuses. However, only one receiving nexus will respond to the address information. That nexus is a responder nexus and it transmits a confirmation of receipt of the command and address information at a fixed interval after the commander nexus transmits that information. Thus, if the central processor unit 10 needs to retrieve data from the memory controller 20A, the central processor unit 10 becomes a commander nexus and transmits a read command and an address to which the memory controller 20A will react initially as a receiving nexus and then as a responder nexus.

After some interval, the memory controller 20A will be prepared to send the retrieved data to the central processor unit 10. As described in the foregoing copending patent applications, it seeks control of the SBI 14. When it gains control, the memory controller 20A becomes a transmitting responder nexus and transfers the requested data onto the SBI 14 for transfer to the central processor unit 10. During this transaction, the central processor unit 10 is a receiving commander nexus.

Similar transactions occur for any information exchange between any two nexuses, although the memory controllers normally function only as responder nexuses and the central processor unit normally functions only as a commander nexus. For purposes of this invention, it will be apparent that typical information exchanges will involve the transfer of instructions, operand specifiers and related information, and data to the central processing unit 10 and the transfer of processed data back to the memory unit 11.

The SBI interface and memory cache circuit 16, as noted, includes a cache, or associative, memory. For transfers of information to the central processing unit 10, the cache memory first will be interrogated to determine whether it already contains the required information. If it does, no exchange of information with the memory unit 11 is necessary. If the cache memory does not contain that information, the SBI interface circuitry initiates a memory reading operation that involves a quadword. This information is transferred into the cache memory along with the physical addresses in the memory units 11 for that information. Simultaneously, the information is routed to the instruction buffer circuit 18 if an instruction is being transferred or to the data path and internal register circuit 19 if other information is being transferred. If the central processor 10 transfers information back to the memory unit 11, it transfers the information into the cache memory. The SBI interface and memory cache circuit 16 then initiates the necessary SBI transactions to first transmit the necessary command and address information and then the data. The details of these transactions are disclosed in U.S. patent application Ser. No. 845,415. An understanding of these details is not necessary for an understanding of this invention.

Figure 3:
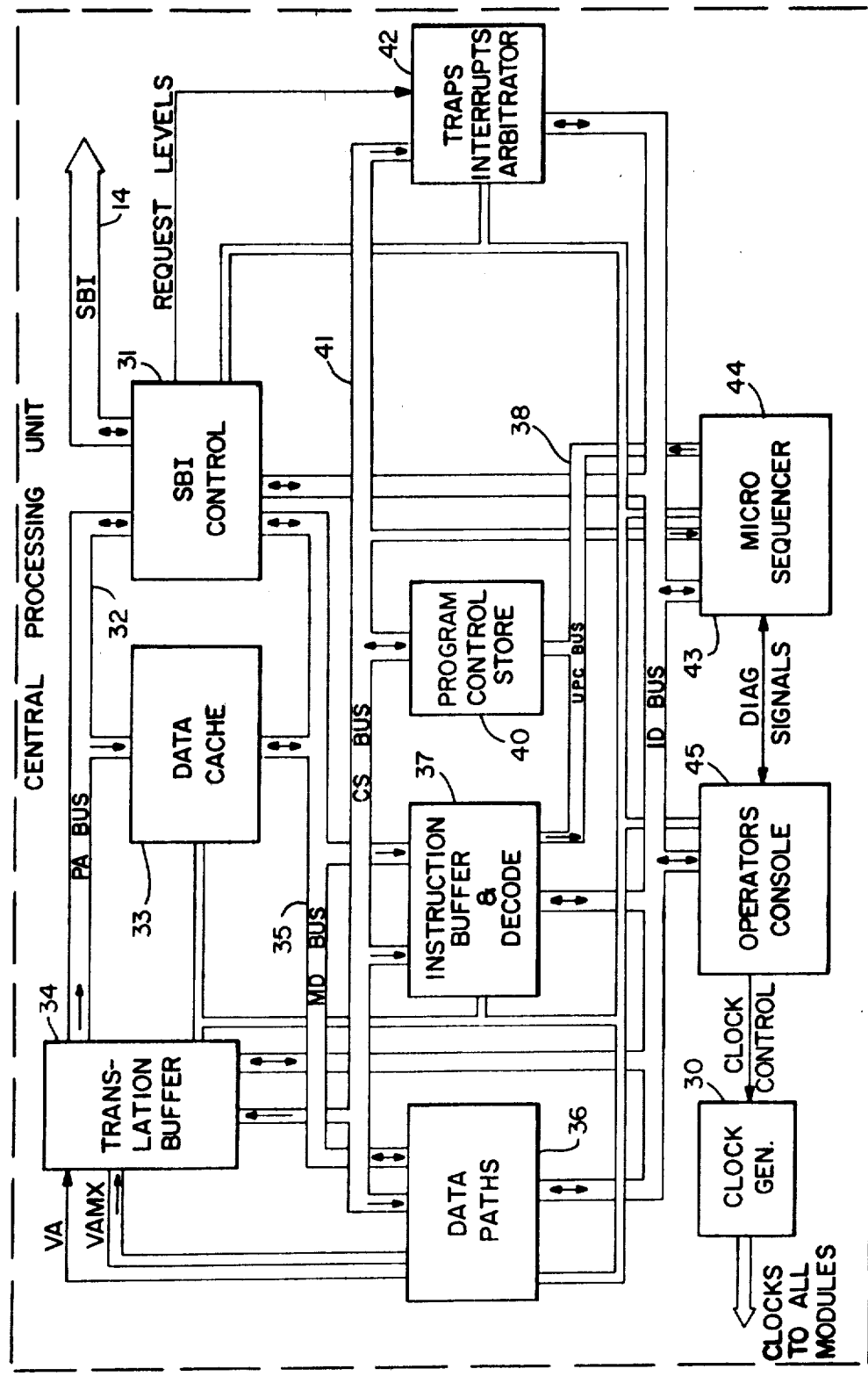
FIG. 3 is a block diagram of the central processor shown in FIG. 1.

FIG. 3 is a generalized block diagram of the central processor unit 10. It depicts the operator's console 15, the SBI 14 and the other circuits that constitute the SBI interface and memory cache circuit 16, the address translation buffer circuit 17 and the instruction buffer circuit 18. More specifically, the central processor unit 10 operates under timing established by a clock generator 30. Specific timing becomes more apparent in the discussion related in the flow diagrams. The SBI interface and memory cache circuit 16 comprises an SBI control circuit 31 that connects to the SBI 14 and to a physical address (PA) bus 32. The PA bus 32 connects to a data cache circuit 33 and to a translation buffer 34. The translation buffer 34 converts virtual address (VA) information and other control information into a physical address that is transmitted simultaneously to the SBI control 31 and data cache 33. Data from the data cache 33 or from any other location on the SBI 14 that passes through the SBI control 31 is conveyed to other elements in the central processor unit 10 over a memory data (MD) bus 35. These units include a data path 36 and an instruction buffer and decode circuit 37.

A microprogram control (UPC) bus 38 conveys signals from the instruction buffer and decode circuit 37 to a program control store 40. The program control store 40 then generates various control signals onto a CS bus 41, and this bus conveys signals to the translation buffer 34, the data paths 36, the instruction buffer and decoder 37 and to a traps-interrupts arbitrator circuit 42. These circuits and the operator's console 15 communicate over an instruction data (ID) bus 43 with a microsequencer 44 that controls the sequence of operations in response to microinstructions stored in the program control store 40.

The microsequencer 44 establishes a retrieval state for obtaining an instruction. A program counter that is located in the data paths 36 generates a beginning address of the next instruction to be retrieved. This address passes from the data paths 36 through the translation buffer 34 onto the PA bus 32. If the data cache 33 contains valid information in a location corresponding to the specified physical address, it transmits data over the MD bus 35 to the instruction buffer and decode circuit 37. As the instruction buffer and decode circuit 37 decodes the instruction, the microsequencer 44 establishes other data paths that transfer other information to the translation buffer 34 thereby to transfer other data into general purpose registers in the data paths 36 from either the data cache 33 or, after a retrieval from the memory units 11 or other memory locations on the SBI 14, from the SBI control 31. One such general purpose register serves as the program counter. If the instruction requires data to be transferred to a physically addressed location, the microsequencer 44 establishes the data paths that are necessary to transfer signals to the translation buffer 34, thereby to form the physical address, and to transfer the data simultaneously to the data cache 33 and to the SBI control 31. During any such transfer the SBI control 31 initiates an exchange with the specified memory location.

Figure 4:
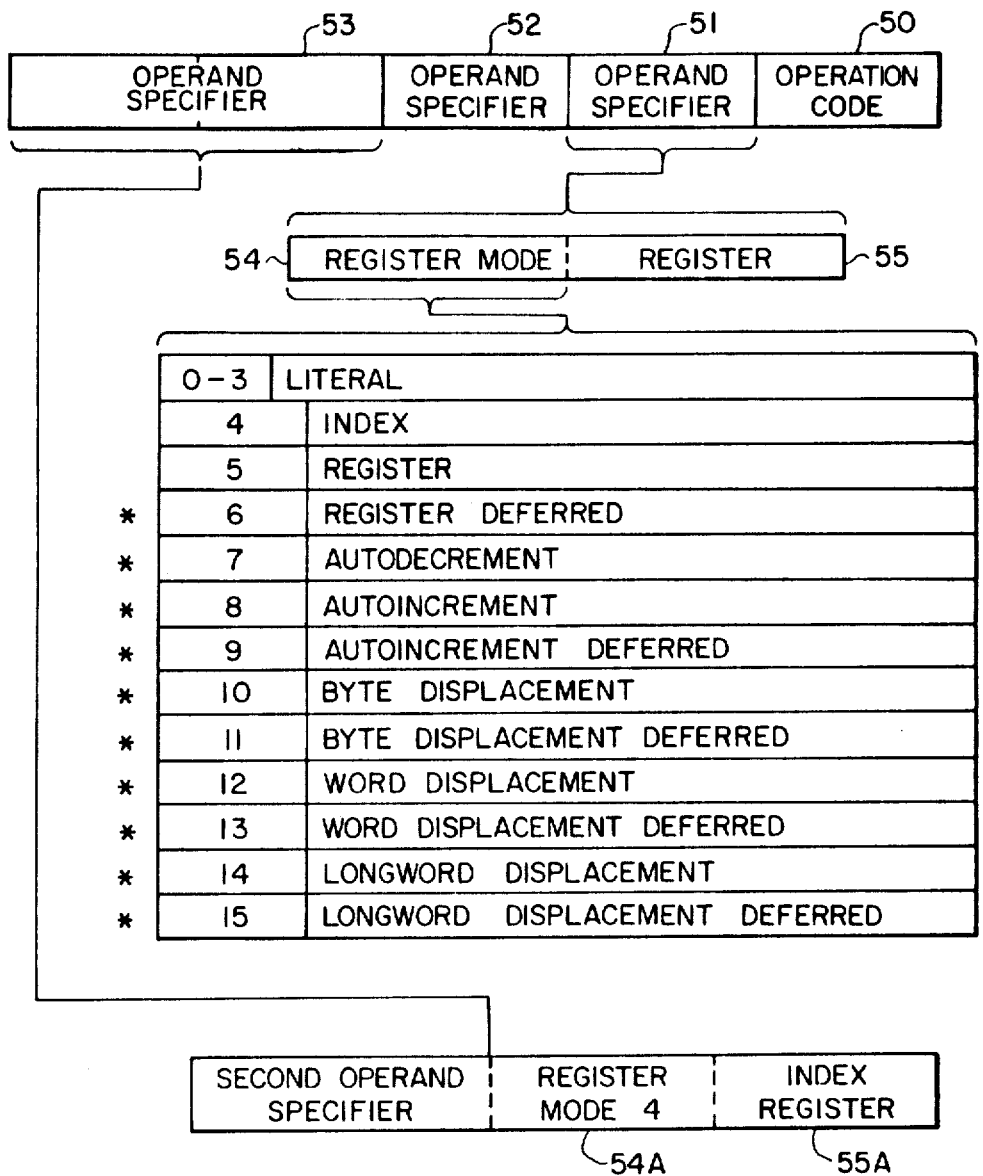
FIG. 4 depicts the format and organization of an instruction that can be processed in the central processor shown in FIGS. 1 and 3.

FIG. 4 depicts a typical instruction that can be processed by the central processor unit 10 shown in FIG. 3. The instruction, shown at the top of FIG. 4, includes an operation code 50 that is depicted as one byte in length. It will become apparent from the following discussion, however, that the central processor unit 10 can be adapted to process multiple-byte operation codes. In this specific instruction three operand specifiers 51, 52 and 53 follow the operation code in sequence. The operand specifiers 51 and 52 each comprise one byte of information whereas the operand specifier 53 comprises two bytes. The format of a single-byte operand specifier also is shown in FIG. 4. It comprises two fields. The high-order bits constitute a register mode field and the low-order bits constitute a general purpose register address field. The general purpose register address field specifies one of the general purpose registers that is located in the data paths circuit 36 shown in FIG. 3 and shown in more detail in FIG. 5. In this specific embodiment the bytes comprise 8 bits so 4 bits are available for each of the register mode and register address fields, thereby enabling any one of sixteen general purpose registers to be addressed by an operand specifier.

If the two most significant bits of the register mode field 54 are zeroes, (register modes 0 through 3), the operand specifier 51 includes the operand, i.e., a literal, which can comprise any data value up to 6 bits representing decimal numbers from 0 through 63.

If the register mode field 54 contains a decimal value of 4, as shown in the register mode field 54A for the operand specifier 53, an index mode is specified. When the register mode field, such as register mode field 54A specifies an indexed addressing mode, the corresponding register field 55A identifies one of the general purpose registers that is to be used as an index register in processing the operand specifier. A secondary operand specifier is included in the instruction for indexed addressing. This secondary operand specifier provides a base address to which the contents of the designated index register are added. A more detailed description of indexed addressing is included later.

When the register mode field 54 contains a "5", register mode addressing is specified. In this mode the general register addressed by the register field contains the operand.

For each of register modes 6, 7 and 8, the specified register contains the memory address for the operand. In mode 6 the designated register contains the address of the operand. In register mode 7 the contents of the designated general purpose register are first decremented before ascertaining the address; in mode 8 the designated general purpose register contents are incremented after the register is used to determine the address. Register mode 9 corresponds to register mode 8, except that the contents of the designated general purpose register specify the address in memory at which the operand address will be found rather than the operand itself.

Modes 10 through 15 are all displacement modes. In the displacement mode the displacement value, which may comprise a byte, word, or longword in modes 10, 12 and 14 respectively, is added to the contents in designated general purpose register to obtain the operand address. Corresponding operations occur in modes 11, 13 and 15 except that the sum of the displacement value and general purpose register contents identifies a memory address at which the address of the operand can be found.

In each of the foregoing modes 8 through 15, the register field 55 of the operand specifier can designate any of the general registers which include the program counter. Moreover, in each of modes 5 through 15, the operand is located on memory whereas in mode 0-3 the operand is a lateral and in mode 5 the operand is in a designated general purpose register.

B. Specific Discussion (1) Initial instruction programming

Figure 5:
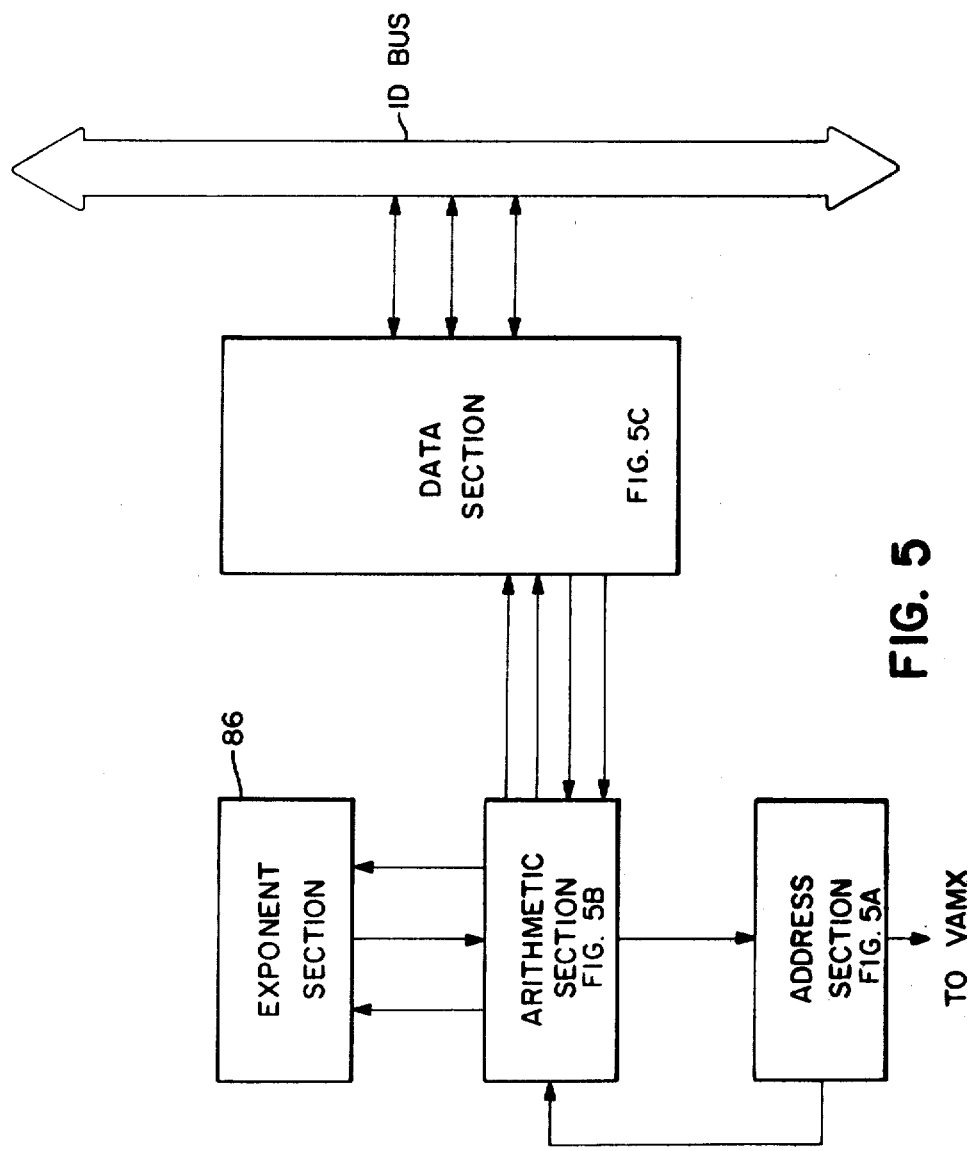

FIGS. 5 and 6A disclose, respectively, further details of the data paths 36 and the instruction buffer and decode circuit 37. There are some basic operating characteristics of the data paths 36 of this specific embodiment which optimize the performance of the central processor unit 10. A detailed knowledge of operations in the data paths 36, however, is not necessary to an understanding of this invention; so they are merely summarized. In FIG. 6A, the instruction buffer and decode circuit 37 comprises an instruction buffer 60 that stores eight consecutive bytes. Transfers into the instruction buffer 60 are made in response to signals from an instruction buffer control circuit 61. Each type position in the instruction buffer 64 contains a validity bit position that indicates whether the data in the remainder of that byte position is valid (i.e., the validity bit position is cleared once the byte is no longer needed). If this validity bit indicates that the data in a specific one or more byte positions is no longer valid, an instruction buffer control circuit 61 generates an IB REQ asignal that requests a transfer to the instruction buffer 60. The requested information arrives over the MD bus 35 either from the data cache 3 or through the SBI control 31. Other circuitry in the instruction buffer control circuit 61 detects the highest order byte position with invalid data and shifts higher order bytes into those byte positions to replace the invalid data. During these transfers, data in all higher order bytes is altered.

The transfers over the MD bus 35 are longwords (FIG. 2C) that pass through a multiplexer 62. A shift network 63 also is associated with the output of the instruction buffer 60 and the input of the multiplexer 62 for use in shifting the data bytes. Thus, the instruction buffer control circuit 61 properly routes the appropriate information into the designated byte positions in the instruction buffer 60. In effect, the instruction buffer control circuit 61 thereby continuously fills the instruction buffer 60 with valid data.

The response of the central processor unit 10 to a typical instruction can now be considered. The instruction buffer control 61 issues an instruction buffer request (IB REQ) signal. At this time, the contents of a program counter register 64, that contains a virtual address, pass through a B multiplexer (BMX) 65 and an arithmetic-logic unit (ALU) 66 to both a virtual address (VA) latch 67 and an instruction buffer address (IBA) latch 68. The virtual address latch 67 stores the instruction address for purposes of establishing the physical address with the circuitry in the translation buffer circuit 34. The instruction buffer address latch 68 is utilized during the subsequent transfer of information into the instruction buffer 60 (FIG. 6A) as information is used from that buffer and becomes obsolete. The foregoing operation constitutes step A1 in FIG. 7.

In step A2, the incoming information that appears on the MD bus 35 in FIG. 6A constitutes all or part of the instruction. This information is transferred through the multiplexer 62 in response to signals from the instruction buffer control circuit 61 and into the instruction buffer 60. At this time, the byte 0 position of the instruction buffer 60 contains operation code information. At this time in the discussion it is assumed that each operation code comprises only one byte.

If only byte 0 position in the instruction buffer 60 contains the operation code, the byte 1 position will contain all or part of a first operand specifier, assuming the instruction includes such an operand specifier. Byte 0 is stored in a byte 0 latch 70 that controls an execution address memory 71. The contents of the byte 1 position are applied to a specifier decode logic circuit 72 along with output signals from the execution address memory 71.

The execution address memory 71 stores a table which includes entries for every instruction that can be executed by the central processing unit 10. The location of a particular entry in that table is derived from the operation code signals from the byte 0 latch 70 and from signals from an execution point counter 73. Initially the execution point counter 73 is set to a reference number (e.g. 0). As each operand specifier main instruction is decoded, the execution point counter 73 is advanced to define a new table entry. Each entry in the table identifies certain characteristics of the operand specifier such as the size of the expected data item and whether the operand specifier identifies a location from which or to which the operand is to be transferred. Signals for each selected table entry pass to the specifier decode logic 72 to control a portion of the starting address that the microsequencer 44 uses to establish the data paths and sequence for decoding the operand specifier. The UPC bus 38 carries the signals from the specifier decode logic 72 to the microsequencer 44.

FIG. 6B depicts operand specifier characteristics that are retained in a specific embodiment of the execution address memory 71. The two low-order bits from the execution address memory 71 specify the type of data item that is involved; normally a data item comprises either an integer number or a floating point number. The next two bits in order indicate the length of the operand. The following two bits specify the operation that is to occur. The last two bits determine information concerning access. For example, if the byte 0 latch 70 and execution point counter 73 identify a location containing the binary number 01001000, the corresponding operand specifier designates a longword integer number that is to be retrieved from memory. As previously stated, there is an entry in the execution address memory 71 for each operand specifier in each instruction that the central processor unit 10 can process. Thus, the operation code from the byte 0 latch 70 produces a base address and the execution point counter 73 produces signals that are combined with the base address to identify, in sequence, the table entries corresponding to each operand specifier main instruction that is being processed.

Output signals from the execution address memory 71 and the operand specifier in byte 1 position of the instruction buffer are transferred to the specifier decode logic 72 that identifies a starting sequence address for any given operand specifier in response to those signals. The starting address for any given microinstruction in the sequence comprises high-order bits that depend upon the instruction itself and low-order bits that depend upon the nature of the information in the operand specifier. Typical low-order starting address bits from the specifier decode logic 72 are shown in FIG. 6C. More specifically, if the register mode field of the operand specifier contains a "4" and the register field does not designate the program counter, the low-order starting address bits are "1C" (in hexadecimal notation. This then controls the location at which the microsequencer 44 begins to execute a sequence beginning with microinstruction located in the program control store 40 (FIG. 3) at the location identified by the starting address.

Before this information is decoded, however, the microsequencer 44 continues to perform other operations. In step A3 the microsequencer 44 uses the register field positions in the byte 1 position of the instruction buffer 60 to transfer to an A latch 75 the contents of a register in the register memory 76 that corresponds to the contents of the register field. If the register mode field in the operand specifier defines any of modes 0 through 3, the operand specifier contains the operand and the operand specifier is decoded. The microsequencer 44 then either begins to process the next operand specifier in the instruction or executes the instruction.

Figure 5A:
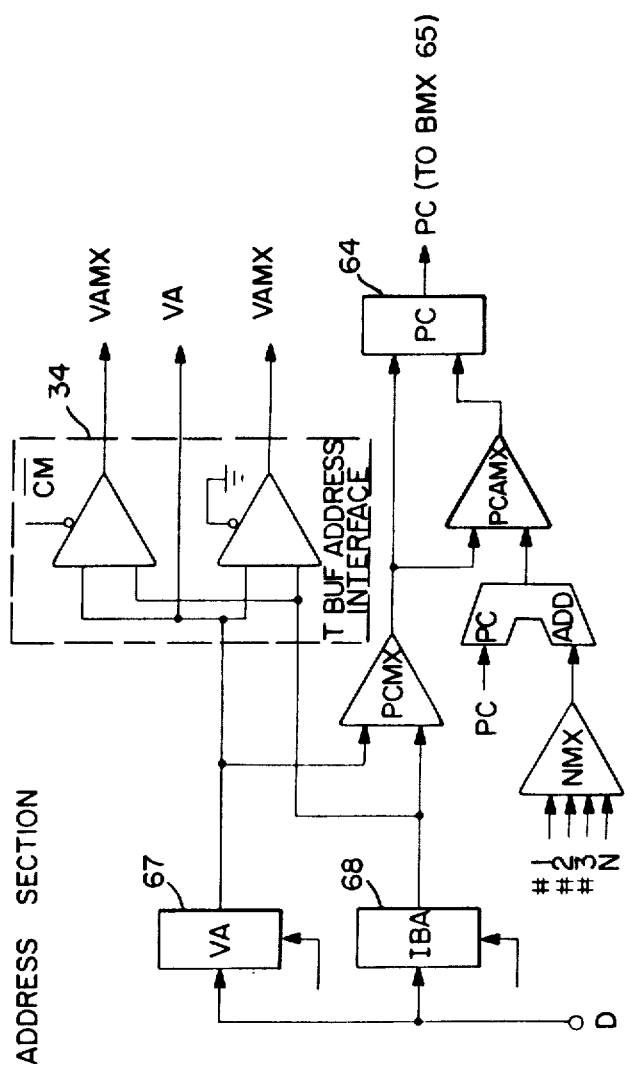

Assuming that the operand specifier does not include a literal, the microsequencer shifts from step A3 to step A4. In this step the contents of the register in the register memory 80 identified by the register field of the information in the byte 1 location of the instruction buffer 60 are transferred to a B latch 81. In this specific embodiment, the A and B register memories 76 and 80 are maintained as copies of one another and constitute all the general purpose registers that can be addressed by the contents of the register field of any operand specifier. For any mode other than a literal mode, the B latch 81 contains an address. Therefore, in step A5, the microsequencer 44 establishes a data path through the B multiplexer 65 (FIG. 5B) and the ALU 66 and transfers the address to the virtual address latch 67 (FIG. 5A). In addition, this addresses passes, without alteration, through a shifting circuit 82 (FIG. 5B), a DF multiplexer 83 (FIG. 5C) and a demultiplexer 84 to a D register 85. Those bits that would correspond to the exponent part of a floating point number are simultaneously transferred from the ALU 66 into an exponent section 86 (FIG. 5) of the data paths 36.

In step A6 the system transfers the contents of the program counter 64 to a program count save register 90 (FIG. 5B) thereby to enable certain instructions that require long processing intervals to be suspended in the event an interruption occurs. Circuitry for detecting interruption conditions and controlling tracing operations then is enabled. The microsequencer 44 in FIG. 3 transfers the contents of the byte 2 through 5 positions in the instruction buffer 60 over the ID bus 43 and through a Q multiplexer 91 (FIG. 5C) to a Q register 92. These byte locations contain information that represents potential displacement values if the operand specifier defines one of the displacement modes.

In step A8 the instruction buffer control 61 is enabled to request transfers of information in order to continuously fill the instruction buffer 60 with valid information. If a number of bytes in the instruction buffer can be cleared, this clearing operation is performed in step A9 and, in step A10, the program counter 64 is incremented to compensate for the number of bytes that have been cleared. This clearing operation and program counter update are performed if relevant data is already in the Q register 92. In step A11 the central processor 10 determines whether the operand specifier contains a literal. If it does, the microsequencer 44 branches to step A12 to place the literal in the Q register 92. Then the next operand specifier is decoded or, if all the operand specifiers have been decoded, the central processor unit 10 processes the operand or operands in response to the operation code. If the operand specifier does not contain a literal, the microsequencer 44 branches to step A13 to complete the operand specifier decoding operation.

At this point in the sequence, the A latch 75 (FIG. 5B) contains information corresponding to the register bit positions from the byte 2 location in the instruction buffer 60 (FIG. 6A). The B latch 81 (FIG. 5B), virtual address latch 67 (FIG. 5A) and D register 85 (FIG. 5C) contain the contents of the register that was selected by the register field bits in the byte 1 position of the instruction buffer 60. The Q register 92 contains any instruction stream data that may exist while the program counter 64 contains the address of the next operand specifier. Further operations depend upon the specific instruction being decoded and the nature of the operand specifier. There are numerous ways in which the central processor can complete the operand specifier decoding operation. An exhaustive description of each possibility would require an extraordinary amount of description. However, the operation of a central processor unit 10 in accordance with this invention can be clearly understood by examining the operation of the central processor unit 10 in response to some typical instructions.

(2) Decoding Operand Specifiers in an Adding Instruction a. Literal and Displacement Addressing Modes FIG. 8A depicts an instruction for adding information in two locations and depositing the sum in a third location without affecting either the first or second storage locations as it would appear in the instruction buffer 60 after the instruction has been retrieved in step A2 in FIG. 7. FIG. 8B depicts the information stored at the table entries in the execution address memory 71

(FIG. 6A) for the operation code associated with this instruction which is "C1". The meaning of the particular bit positions that constitute the operand specifier information are shown in FIG. 6B. P The first operand specifier is "07". With the execution point counter 73 at "00", the corresponding table entry in the execution address memory 71 contains the following information: (1) a specifier has been selected (bits 4 and 5); (2) the operand is an integer number (bits 0 and 1); (3) the operand contains four bytes (bits 2 and 3); and (4) the operand is being read from the memory (bits 6 and 7). Furthermore, the information that is transferred from byte 1 position in the instruction buffer 60 into the specifier decode logic 72 causes the specifier decode logic 72 to produce "00" as the low-order bits in the starting address for the microsequencer 44. (See FIG. 6C). Following the sequence in FIG. 7, the microsequencer 44, in step B1 in FIG. 8C, establishes the necessary data paths to transfer this literal, namely "7" from the Q register 92 to the D register 85 through a shift register 93 that acts as a data aligner and the D multiplexer 84. At this point, the instruction buffer control 61 shifts bytes 2 through 7 one byte position to the right and advances the execution point counter 73 to "01" (step B2). From the table in FIG. 8B it will be seen that this indicates that the information now in byte 1 (is an operand specifier for a longword integer number that is to be transferred into the central processor unit 10 during a reading operation.

Figure 7:
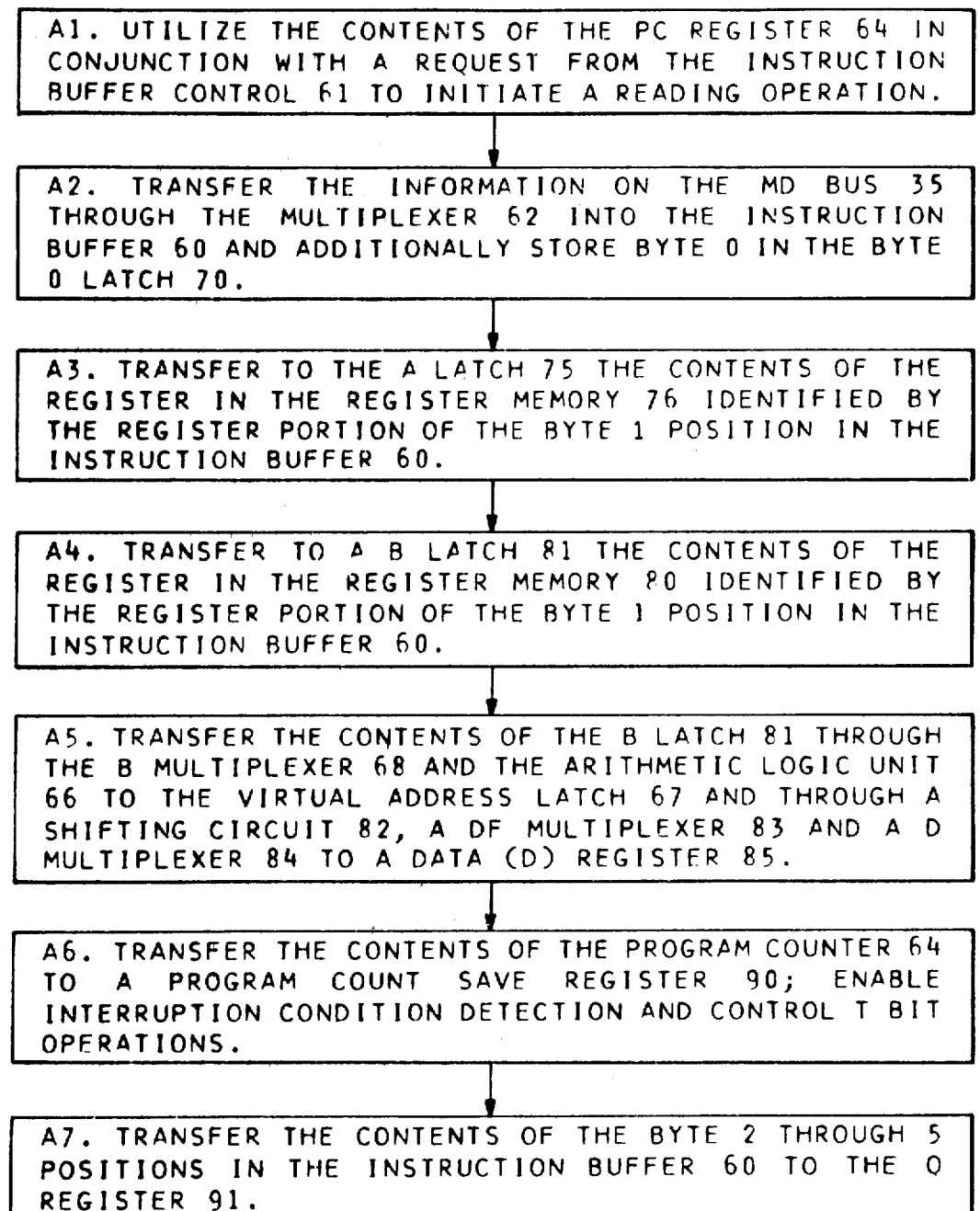
FIGS. 7 and 7B constitute a flow diagram that is useful in understanding the operation of the central processor unit shown in FIGS. 1 and 3.
Figures 8A, 8B:
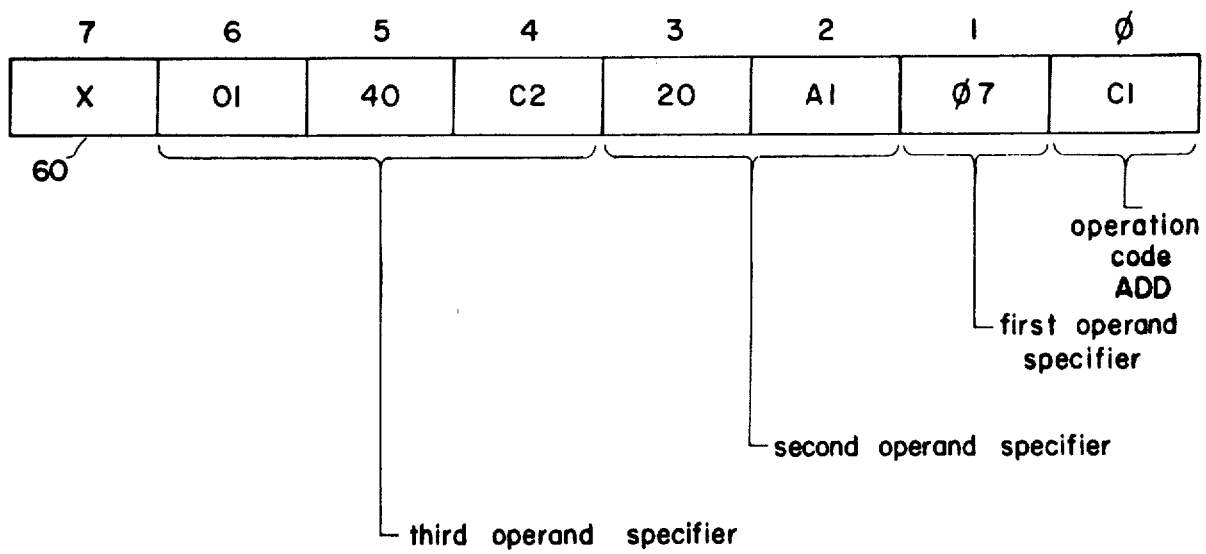
FIG. 8A depicts the format of a specific instruction.
FIG. 8B depicts certain information that is derived from that instruction; an FIG. 8C, comprising

Now the system immediately transfers back to the steps in FIG. 7. At step A11 the second operand specifier is evaluated. In combination with the information now provided by the various tables in FIGS. 4, 6B, 6C and 8B, the microsequencer responds to establish the sequence of data paths that are necessary to decode an operand specifier that uses a byte displacement mode of addressing. During this decoding sequence the A latch 75 (FIG. 5B) and B latch 81 both receive the contents of the designated general register ("R1") (step B3). The Q register 92 (FIG. 5C) receives the byte displacement value "20" byte 3 in step B4. In steps B5 the ALU 66 (FIG. 5B) produces the sum of the contents of the B latch 81 which contains the contents of the designated register and the contents of the Q register 92 which contains the displacement value. More specifically, the contents of the Q register 92 pass through the RA multiplexer 94 (FIG. 5C) and an A multiplexer 95 (FIG. 5B) into the A input of ALU 66 while the contents of the B latch 81 pass through the B multiplexer 65 into the B input of the ALU 66. The sum of those two inputs represent the displaced address which is then transferred to the virtual address latch 67 (FIG. 5A) and also back through the shifting network 82 (FIG. 5B), DF multiplexer 83 (FIG. 5C) and Q multiplexer 91 to the Q register 92. Now, in step B6, the microsequencer 44 enables the instruction buffer control 61 to clear out the contents of the second operand specifier and to initiate a request to obtain the second operand in step B7. In step B8 the microsequencer 44 transfers the second operand from the MD bus 35 through a data aligner 96 (FIG. 5C) and the D multiplexer 84 to the D register 85 and the first operand is transferred to the Q register 92.

Now the microsequencer 44 advances the execution point counter 73 (step B9) to the third table entry in FIG. 8B that specifies an execution. Therefore, the microsequencer 44 controls the ALU 66 so that it generates the arithmetic sum of the two addends and transfers the sum into the D register 85 (FIG. 5C) during step B10.

In step B11 the microsequencer 44 advances the execution counter 73 to "11", the final state shown in FIG. 8B. The information in the table indicates that the operand specifier designates an address in memory to which a four-byte integer number is to be written. The value C2 is resident in the byte 1 position of the instruction buffer 60, and the "C" in the register mode field defines a word displacement address. Therefore, the microsequencer 44 uses steps B12 through B16 to calculate the memory address and to initiate a transfer of the sum to that memory location. When these steps have been completed, the microsequencer 44 clears the execution point counter 73 in step B17 and reverts to the steps in FIG. 7 thereby to initiate the transfer and decoding of the next instruction in sequence.

(3) Floating point accelerator

Figure 7A:
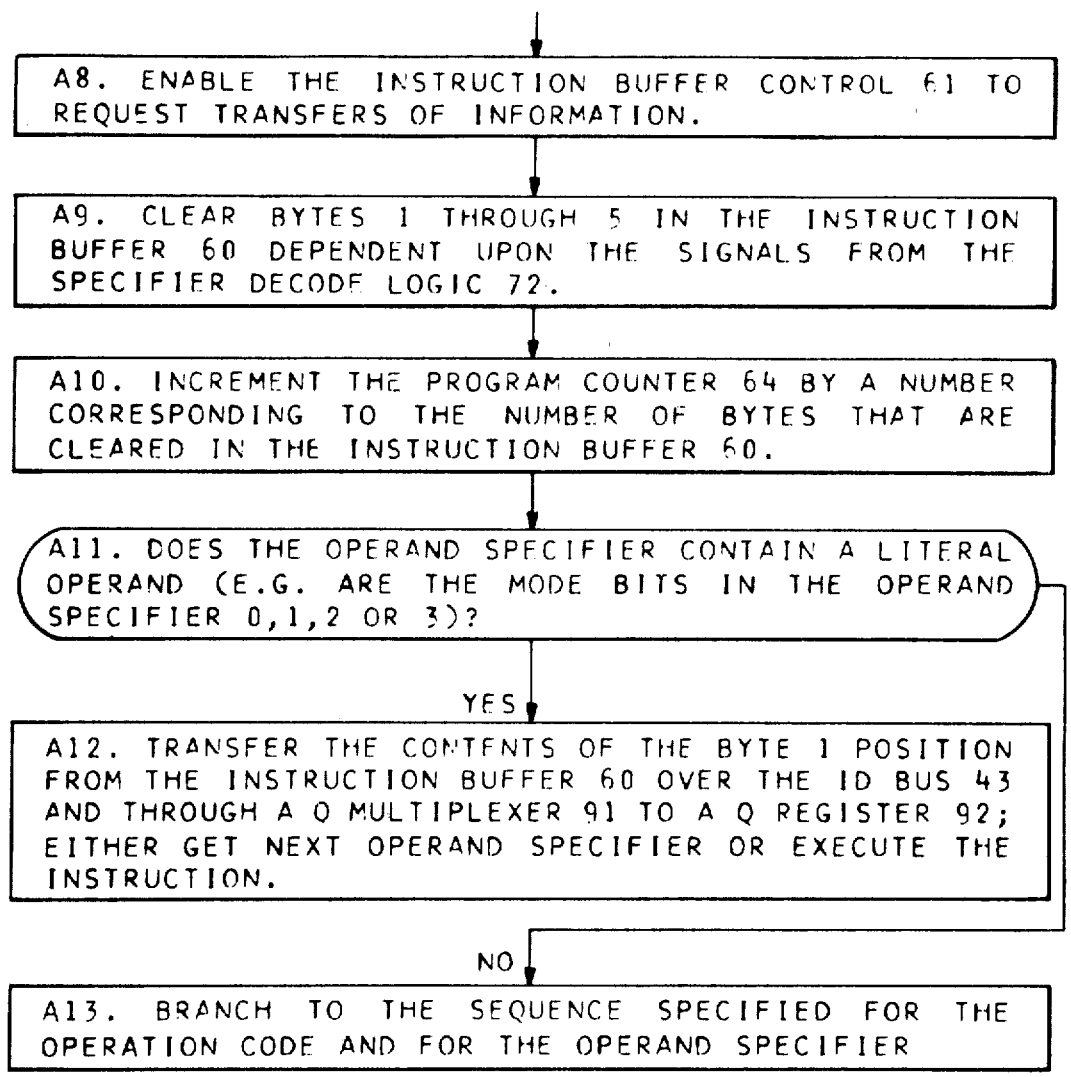
Figure 9:
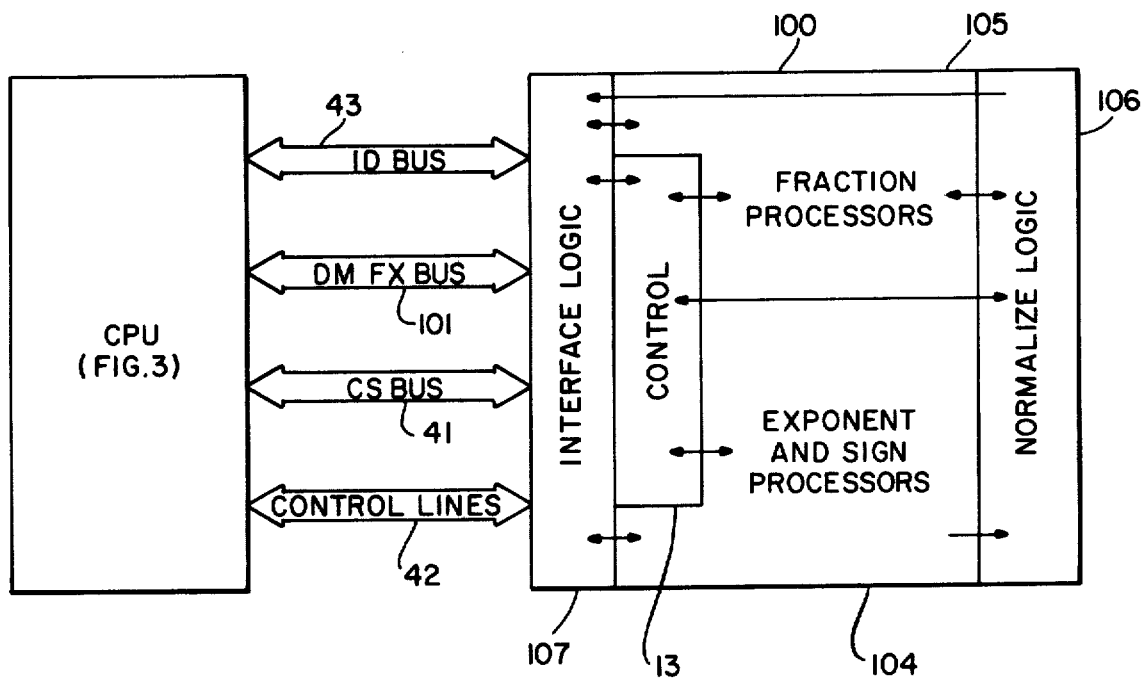
FIG. 9 is a block diagram of the interconnection between a central processor shown in FIG. 3 and a floating point accelerator circuit constructed in accordance with this invention.
Figure 10:
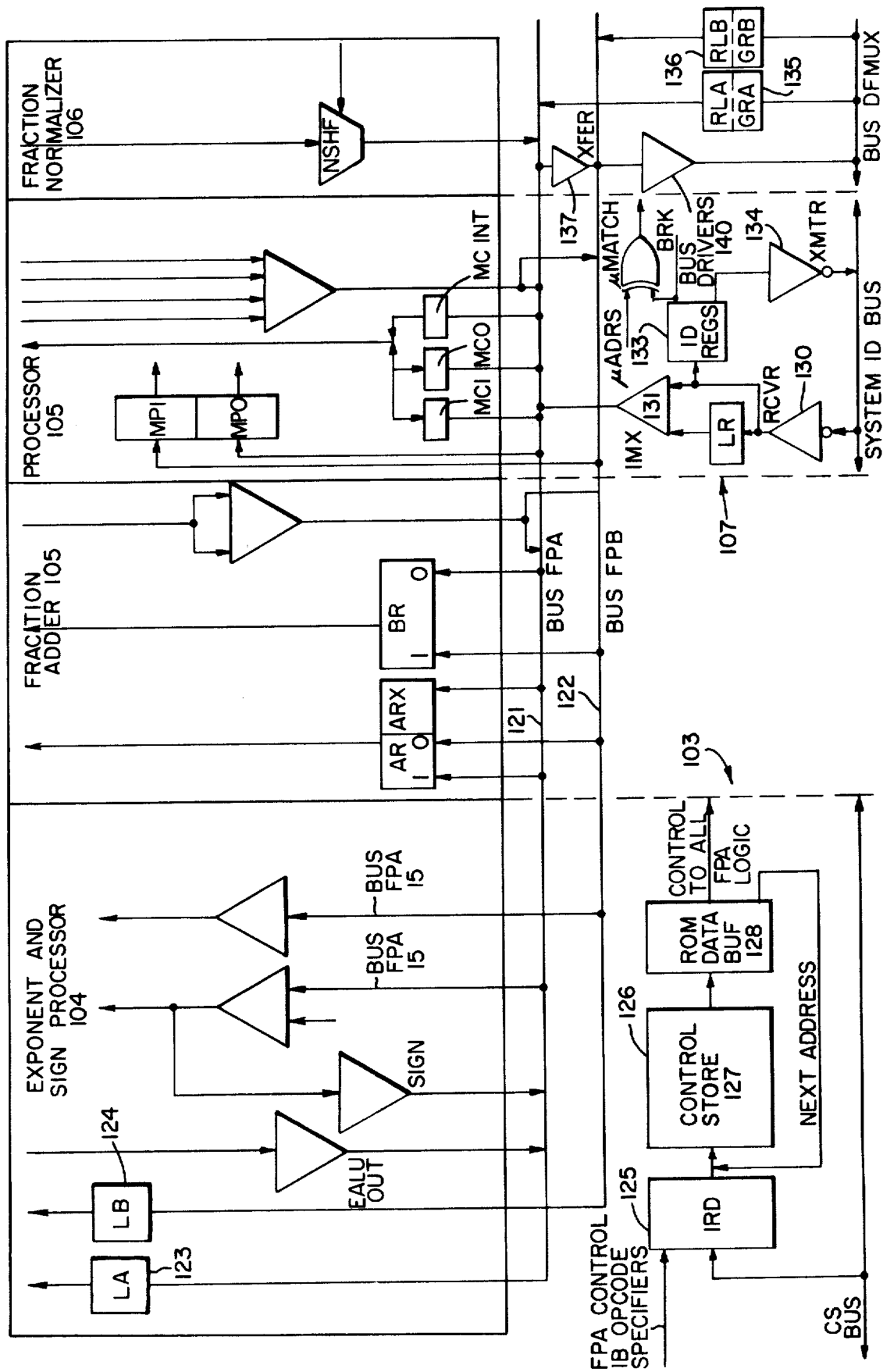
FIG. 10 is a block diagram of portions of the floating point accelerator circuit shown in FIG. 9.
Figure 11:
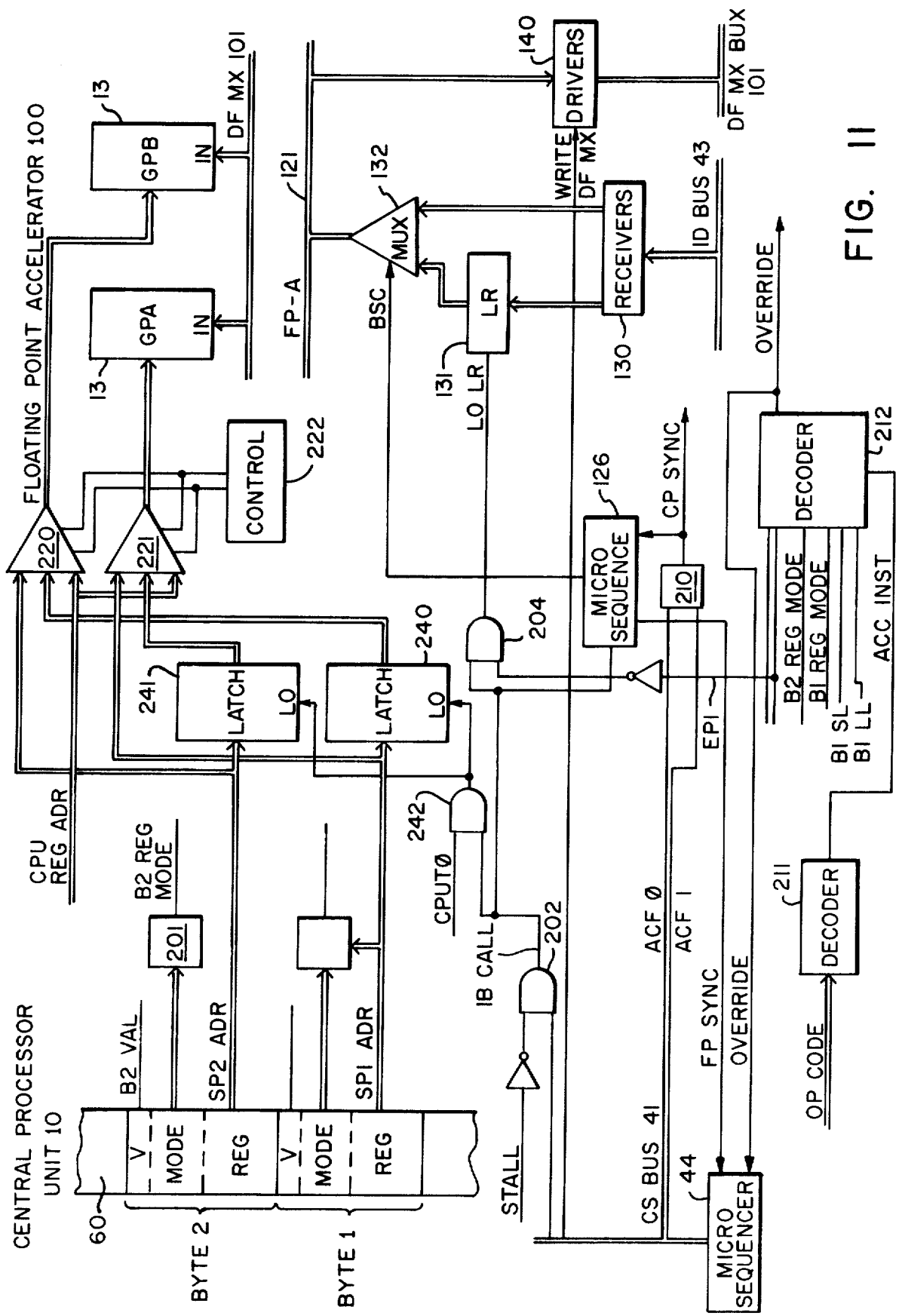
FIG. 11 is a logic diagram of portions of the circuit shown in FIG. 10.

FIGS. 9 through 11 disclose a floating point accelerator circuit that is particularly useful in increasing the overall efficiency of a data processing system, especially when floating point arithmetic operations are undertaken extensively. It is assumed that the microsequencer 44 shown in FIG. 3 does contain the necessary information to process these instructions. It will be apparent that some of these instructions will specify very complex operations. However, the general discussion with respect to FIGS. 7 and 7A still applies. Therefore, it will be helpful to summarize the operations of the central processor unit 10 in FIG. 3 as it retrieves operands before describing the floating point accelerator in detail.

Each instruction in a program is processed in accordance with one or more sets of data transfers across data paths that are established by control states within the central processor unit 10 in FIG. 3. The program control store 40 establishes the individual states in each set of control states and the micro sequencer 44 selects different sets in order for establishing the necessary data paths. The selection process involves several decisions. For example, upon decoding an instruction, it is necessary to decide if the instruction contains an operand specifier. If it does, it then is necessary to determine if it contains a second operand specifier. Another decision must also be made to determine whether there is a third operand specifier, as there is in the instruction shown in FIG. 8A. Each such decision is made at a predetermined point in the processing cycle for each instruction, and each decision point is called a "fork." In FIGS. 7, 7A and 8C forks are encountered after steps A13, B4 and B9.

There are three possible sources for operands that are to be processed. Conventionally, operands are found in the memory. In this central processor, however, operands also can be found in the general registers of FIG. 5B (addressing mode 5) or in the instruction stream itself (e.g., addressing modes 0 through 3). With respect to this particular central processing unit, operands in the instruction stream are called "literals" and therefore are found in the instruction buffer 60 (FIG. 6A). In all cases, the first of one or more operands is moved from its source to the D register 85 in FIG. 5C. If a second operand is retrieved, the first operand moves to the Q register 92 and the second operand moves to the D register 85.

Reference is now made to FIG. 9. The floating point accelerator in that figure is an example of a special instruction processor that is constructed in accordance with this invention. This particular floating point processor connects to the central processor unit shown in FIG. 3 over a number of buses including the CS bus 41, the ID bus 43 shown in FIG. 3 and a DFMX bus 101 that connects to the output of the DFMX multiplexer 83 in FIG. 5C. Control lines 102 also connect the floating point accelerator 100 to the central processor unit.

In this particular embodiment the floating point accelerator is divided into a number of functional units that are under the operation of a control circuit 103. These units include an exponent and sign processor 104, a fraction processor 105 and normalization logic 106. All these circuits communicate with the various conductors to the central processor through interface logic 107. Although the following description is limited to this floating point accelerator, it will become apparent that the floating point accelerator is an example of a special processor that can process any type of complex instruction.

Referring now to FIG. 6A and FIG. 9, the ID bus 43 generally receives memory data and literals from a demultiplexer in FIG. 6A and these signals are coupled to the floating point accelerator. The operation code from the byte 0 latch 70 and the execution point count from the counter 73 also both are transferred to the floating point accelerator 100 over the control lines. In addition, a decoder 110 connects to the byte 1 and byte 2 locations of the instruction buffer 60 to produce a number of other control signals. The CS bus 41 conveys two bits of information that are important to this invention and that constitute an accelerator control field (ACF). This field is used during transfers of information to and from the floating point accelerator 100. When the accelerator control field has a value of "0", the floating point accelerator does not respond. An accelerator control field of "1" constitutes a CP SYNC signal; a value of "2", an accelerator trap function; and a value of "3", an instruction concerning the use of three other bits in the CS bus. There also is a WRITE DFMX signal that conditions the accelerator to transfer a result back to the central processor unit 10.

In addition to the foregoing control lines, the control 103 generates an OVERRIDE signal back to the central processor unit thereby to alter its control and inhibit execution of the instruction in the central processor unit. The control 103 also generates an FP SYNC that also is used during transfers with the CP SYNC signal.

FIG. 10 discloses the interconnection of the interface logic 107 and control 103 to the functional units over FP-A and FP-B buses 121 and 122. These buses connect to input registers and drivers in the functional units, such as LA and LB latches 123 and 124 in the exponent and sign processor 104. It also discloses within the control logic 103 an instruction register decoder 125 that receives the operation code from the byte 0 latch 70 in FIG. 6A. In response to this a microsequencer 126, including a control store 127 and a data buffer 128, produces a sequence of signals including the FP SYNC signal that are required to enable the floating point accelerator to process data.

As previously indicated, the operand may be in the instruction stream as a literal, in a register or in memory. Each time the central processor unit retrieves an operand in response to any instruction and from any of these sources, it enables a transfer of that operand to the floating point accelerator unit. The system ID bus 43 provides literal data and other information through receivers 130 directly into an LR register 131 for subsequent transfer through a multiplexer 132. Memory operands bypass the LR register 120 during a transfer to the input registers. In both cases, however, the operands are placed on the FP-A bus 121. Various control registers 133 may also be loaded with information from the ID bus 43 and the information in the registers can be transferred back onto the ID bus through a transmitter 134.

Figure 5B:
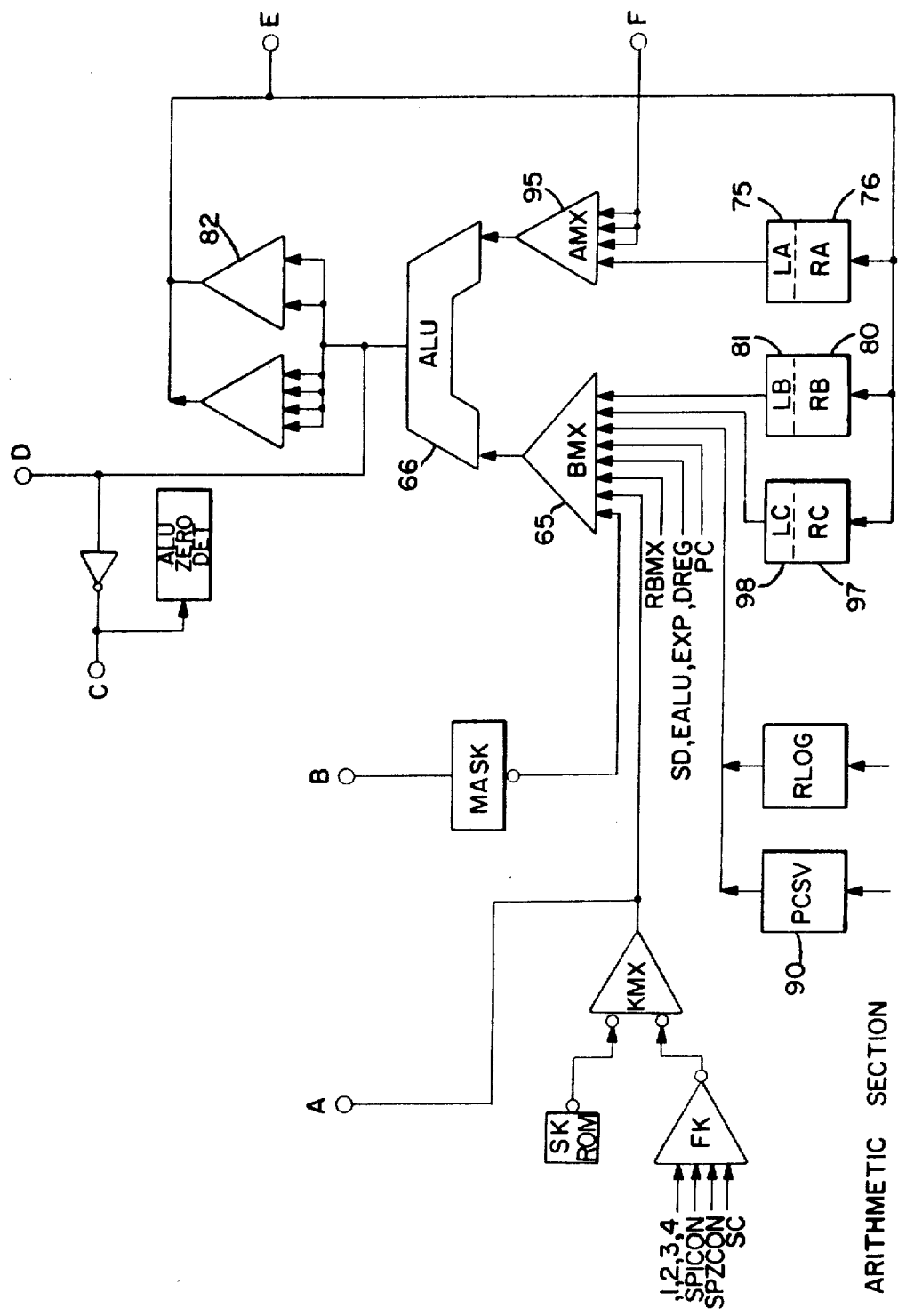

Copies of the general purpose registers in FIG. 5B are maintained in corresponding sets of registers 135 and 136 from the DFMX bus 101. Results on the FP-B bus 122, that appear on that bus directly or through a transfer circuit 137, pass to the DFMX bus 101 through bus drivers 140.

Now referring to the instruction buffer 60 in FIG. 6A, assume that it contains a floating point add instruction with the same operand specifiers that are shown in FIG. 8A. Referring specifically to FIG. 11, when the instruction is initially received, the byte 1 location in the instruction buffer 60 contains a literal and the byte 2 location contains the first byte of the second operand specifier. A decoder 200 receives the addressing mode bits from the byte 1 location. This decoder generates a B1 REG MODE signal if the operand specifier defines addressing mode 5 or a B1 SL signal if the operand specifier defines any of addressing modes 0 through 3. In addition, a B1 LL signal is generated if the addressing mode is 8, designating an auto-increment indirect register transfer and the designated register is the program counter. If none of these lines from the decoder 200 is operand asserted, then, implicitly, the operand to be retrieved from memory.

A decoder 201 receives the addressing mode information from the byte 2 location. If either the B1 REG MODE or B1 SL signal from the decoder 200 is asserted and the addressing mode in the byte 2 location is 5, the decoder 201 produces a B2 REG MODE signal. Thus, the decoders 200 and 201 characterize the source of the operands. In particular the decoder 200 indicates whether the operand is to be retrieved from the instruction stream, from a general purpose register or from memory.

The control signals from the decoders 200 and 201 are transferred to the floating point accelerator 100. In addition, B1 VAL and B2 VAL signals that indicate the validity of the data in the byte 1 and byte 2 locations also is transferred. The register address portions of the two byte locations, the WRITE DFMX, the ACF 0 and 1 signals also are transferred. In addition, the microsequencer 44 generates a CALL signal at each fork entry. This signal will produce an IB CALL signal from the AND gate 202 if a STALL signal is not asserted. If the instruction buffer 60 does not contain sufficient information, it requests additional information as previously described. During that request the STALL signal is asserted. Thus, the IB CALL signal, when asserted, indicates that the central processor unit is at a fork and that the instruction buffer 60 contains sufficient information to specify an operand.

Figures 1, 8C:
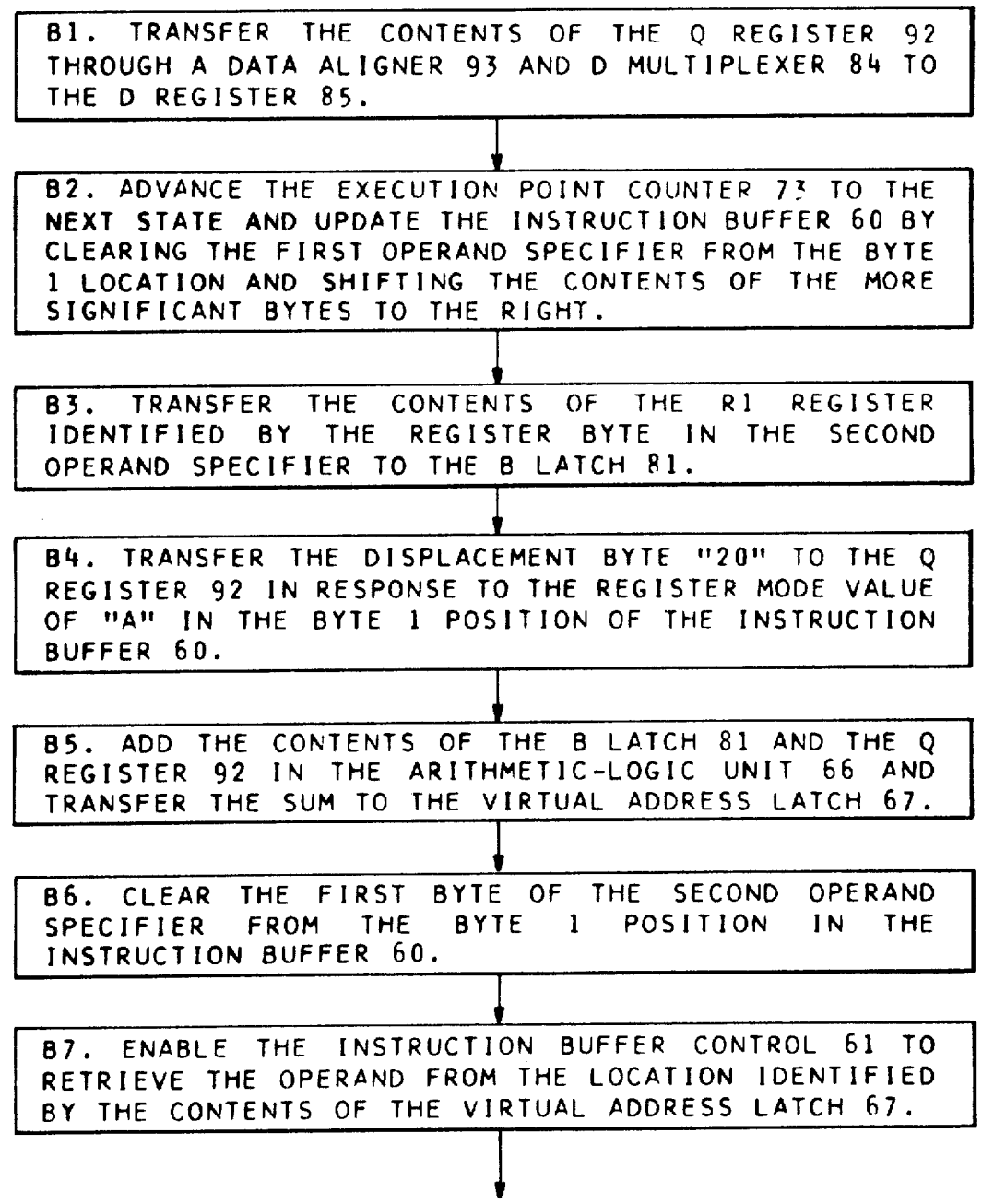

Now referring to FIG. 8C-1 at that time that the byte 1 location contains the value "A1" from the second operand and the byte 2 location contains the displacement value. No output from the decoder 200 is asserted thereby indicating that the operand is being retrieved from memory. The output from the decoder 201 has no meaning in this case. At this time the microsequencer 44 generates a CALL signal and the AND gate 202 will, if the STALL signal is not asserted, generate the IB CALL signal. The IB CALL signal is one input to the microsequencer 126. It additionally energizes an AND gate 204 if an EP1 signal from the execution point counter 73 in FIG. 6A is not asserted. This signal is not asserted while the execution point counter is transmitting signals corresponding to a value of "0" or "1". At this time the EP1 signal is not asserted so the AND gate 204 generates a LD LR pulse that loads the contents of the ID bus 43 from the receivers 130 into the LR register 131. As the information on the ID bus 43 includes the literal, the LR register 131 thereupon contains the literal that is to be processed.

As step B5 in FIG. 8C-1 the microsequencer 44 issues a CP SYNC signal which is generated in the floating point accelerator 100 by a decoder 210. The CP SYNC is transferred to the microsequencer 126. However, at this time the information on the ID bus 43 is the displacement value and has no meaning.

Figures 2, 8C:
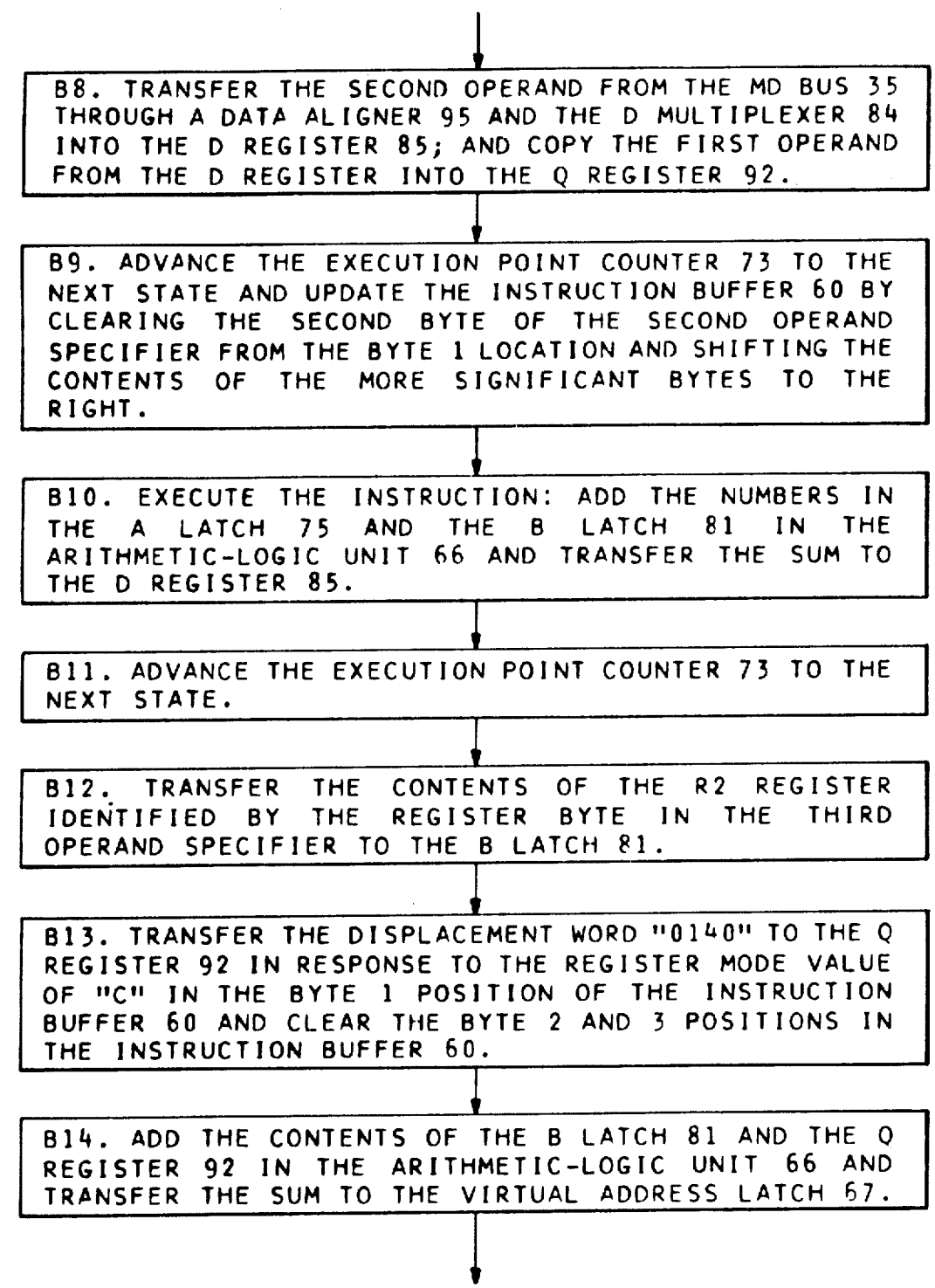
Figures 3, 8C:
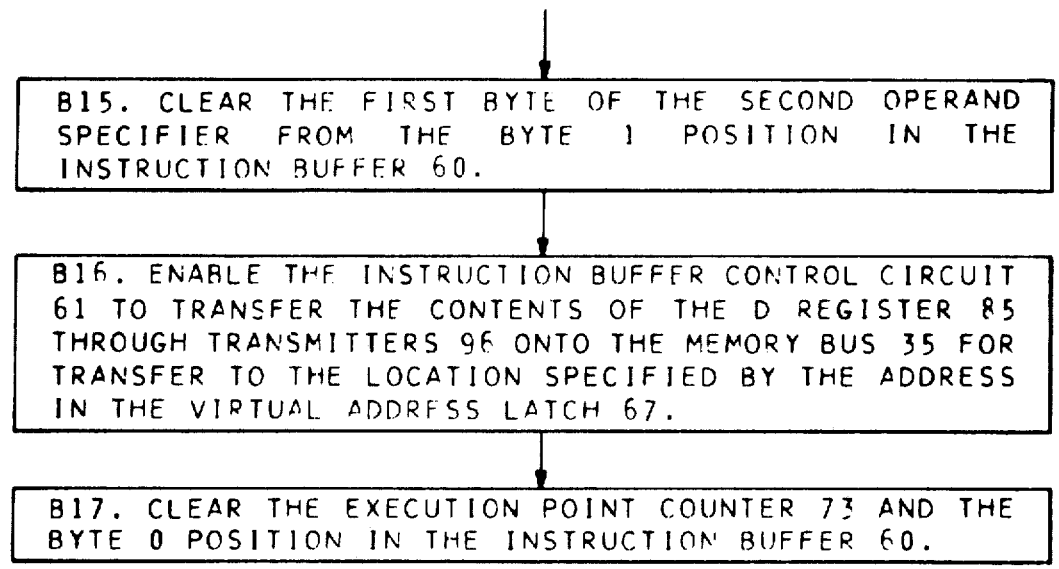

After step B9 in FIG. 8C-2 the microsequencer 44 again generates a CALL signal so the AND gate 202 generates another IB CALL signal. Prior to step B9, the microsequencer 126 has transferred the information from the LR register 131 through the multiplexer 132 onto the FP-A bus 121 and into an appropriate input register. In addition, a decoder 211 that receives the operation code signals from the byte 0 latch 70 asserts an ACC INST signal, as it has been assumed that the instruction is a floating point instruction. If another instruction were being processed that was not within the set to which the floating point accelerator responded, then, obviously, the ACC INST signal would not be asserted. After step B9 the execution point counter 73 in FIG. 6A will advance to a state "2" and the combination of this state and the assertion of the ACC INST signal causes a decoder 212 to generate an OVERRIDE signal. The OVERRIDE signal is transferred back to the microsequencer 44 and forces it into an alternate set of control states thereby bypassing those control states that would otherwise process the operands. More specifically, the program control store 40 in FIG. 3 can contain two sets of control states for "executing" the instruction. One would be implemented if no floating point accelerator were present; the other, at the other set of locations in the program store, would be implemented in response to the OVERRIDE signal.

Once the OVERRIDE signal has been asserted, the functional units in the floating point accelerator 100 shown in FIGS. 9 and 10 use the retrieved operands and the operation code to compute a result. When the computation is complete and result is available on the FP-A bus 121, the microsequencer 126 generates an FP SYNC signal and then may enter a wait state. During the execution by the microsequencer 44 in its alternate set of control states normally only the destination of the computed result is determined. When that determination has been made, the microsequencer 44 again generates signals on the ACF conductors that enable the decoder 210 to produce the CP SYNC signal. When both the CP SYNC and FP SYNC signals are asserted, the microsequencer 44 generates the WRITE DFMX signal that enables the drivers 140 to transfer the result onto the DFMX bus 101 for transfer into the D register in FIG. 5B. The microsequencer 44 then completes the transfer of the computed result to the destination and is then able to retrieve a next instruction in sequence.

It is possible, as previously indicated, for two operands to be stored in the general purpose registers. In that case, the processing can be optimized by reducing the operand fetch time. In accordance with this invention, no memory retrievals are necessary. More specifically, the floating point accelerator general purpose registers 135 and 136 are, as previously described, copies of the general purpose registers in the central processing unit. More specifically, multiplexes 220 and 221 are conditioned by a multiplexer control circuit 222 to convey the CPU REG ADR signals from the central processor unit to the GRA and GRB circuits 135 and 136 respectively. In the central processing unit these address signals are generated to select one of the general registers and information is written into those general registers from the DFMX bus 101. As a result, the GRA and GRB general register sets 135 and 136 contain the first and second operands when the first and second operand specifiers both indicate that the first and second operands are in the general purpose registers.

When an instruction with two operands in the general register sets is transferred to the instruction buffer 60, the decoder 200 and the decoder 201 assert the B1 and B2 REG MODE signals simultaneously. The decoder 212 in FIG. 11 responds to these signals together with the B1 VAL and B2 VAL signals that indicate the byte 1 and 2 locations contain valid data. If the execution point counter 73 in FIG. 6A has reached a count of "0" (at the completion of the instruction decoding and at the first fork) the decoder 212 immediately generates the OVERRIDE signal. Thus, the transfers that were described in the previous example are eliminated.

A similar optimization occurs if the first operand is in the instruction stream. In this case the decoder 200 asserts the B1 SL signal. If the decoder 201 then simultaneously asserts the B2 REG MODE signal, the decoder 212 again generates the OVERRIDE signal and produces immediate execution at the first fork.

If the first operand is retrieved from memory and the second operand to be processed then is in a register, it is still possible to optimize the process. After the first operand specifier has been evaluated, the first operand is transferred through receivers 130 and directly through the multiplexer 132 onto the FP-A bus 121. The information in the instruction buffer also shifts so that the second operand specifier moves into the byte 1 location. If the second operand specifier is a register mode specifier, the decoder 200 again generates the B1 REG MODE signal and the decoder 212 generates the OVERRIDE signal so the execution begins at the second fork.

In this particular case, it is possible for the register address to be lost before the register location for the second operand is obtained. For that reason the register identification field in each of the byte 1 and byte 2 locations is stored in intermediate latches 240 and 241. This is accomplished by loading the latches in response to a timing pulse from an AND gate 242 that reflects the coincidence of an IB CALL signal and a CPU T0 timing pulse. Circuitry for generating the CPU T0 timing pulse is described in a copending patent application Ser. No. 845,415. Thus, the latches 240 and 241 contain register address information that can be routed through the multiplexers 220 and 221 to the appropriate ones of the general purpose registers 135 and 136.

In summary, the circuitry in FIG. 11 includes the previously described operand characterization circuitry in the central processing unit 10. In addition the floating point accelerator 100 contains circuitry that responds to that characterization circuitry by advancing the time that the floating point accelerator will begin to execute an instruction in appropriate circumstances. These circumstances can arise when one or more of the operands is in the instruction stream or in the general purpose registers. Overall operation and execution of the instruction thereby is optimized by minimizing the time that is necessary for retrieving the operands.

The foregoing description is limited to a specific embodiment of this invention. It will be apparent, however, that this invention can be practiced in data processing systems having diverse basic construction or in systems that use different internal circuitry than is described in this specification with the attainment of some or all of the foregoing objects and advantages of this invention. Therefore, it is the object of the appended claims to cover all such variations and modifications as come within the true spirit and scope of this invention.

What is claimed as new and desired to be secured by Letters Patent of the United States is:

1. In a digital data processing system including central processing means for executing instructions and for connection to memory means for storing instructions that include operation codes representing operations to be performed and operand specifiers that indicate the operands on which the operations are to be performed and wherein the central processing means includes addressable register means for storing information including operands, retrieval means for retrieving operands in response to the operand specifiers, code means for generating operation code signals that identify an operation to be performed with respect to at least one operand in accordance with an operation code of an instruction, and processor means connected to the retrieval means and the code means for either processing the retrieved operands in response to certain operation code signals or entering an alternate state of operation in response to predetermined ones of said operation code signals, said processor means including destination computation means for computing a destination address in said memory means at which a result is to be stored and for generating a destination ready signal for indicating that said central processing means is ready to receive a result of at least one operand processed in response to said predetermined operation code signals, a special instruction processing means for processing predetermined ones of the instructions corresponding to said predetermined operation codes, said special instruction processing means including:

A. operand means for retrieving each operand concurrently with the retrieval thereof by the retrieval means in the central processing means, B. special processing means connected to said operand means and operable to process the operands;

C. control means connected to the central processing means and said special processing means for receiving each of the operation code signals from the code means concurrently with the processor means in the central processing means, for recognizing said predetermined code signals, for operating said special processing means to process the operands in said operand means in response to said predetermined operation code signals, and for automatically disabling the processing of the retrieved operands by the processor means in accordance with said predetermined operation codes when said control means receives one of the predetermined operation code signals but permitting said destination computation means to compute said destination address, and D. transfer means connected to said special processor means for transferring to the central processing means the result of the operation by said special processing means in response to said destination ready signal.

2. A special instruction processing means as recited in claim 1 wherein said operand means includes:

i. data storage means connected to said special processing means for storing operands retrieved from said memory means, and ii. register storage means connected to said special processing means for receiving information contained in the addressable register means in said central processing means.

3. A special instruction processing means as recited in claim 2 wherein said special processing means includes:

i. at least one functional unit for processing operands, ii. input bus means interconnecting said operand means and said functional unit for receiving data to be processed by said function unit, iii. output bus means interconnecting said functional unit and said transfer means for receiving said result from said functional units, and iv. microsequencer means connected to said functional unit for controlling the operation thereof for producing said result.

4. A special instruction processing means as recited in claim 3 wherein said functional units further comprise:

i. exponent and sign processing means for processing said operand, ii. fraction processing means for processing said operand, and iii. normalization means connected to said fraction processing means for normalizing the result thereof.

5. A special instruction processing means as recited in claim 3 wherein said microsequencer means comprises:

i. program control store means responsive to said predetermined operation code signals for generating functional unit control signals, and ii. functional unit control means connected to said program control store means and to said functional units, said functional unit control means being responsive to said functional unit control signals for controlling the operation of said functional units.

6. A special instruction processing means as recited in claim 3 wherein said central processing means includes means for generating a first control signal for retrieving information from said memory means, means for generating a second control signal for indicating that the central processing means is ready to receive said result, and means connected to said transfer means for generating a third control signal for initializing said transfer means to transfer said result to said central processing means, and wherein said control means further includes:

i. first control means connected to said operand means responsive to said first control signal of the central processing means for loading operands in said operand means, and ii. means for generating a fourth control signal that indicates the completion of the processing of an instruction by said special processing means thereby to enable said central processing means to generate said third control signal when said central processor means generates said second control signal thereby to transfer said result to the central processing means.

7. A special instruction processing means as recited in claim 6 wherein said central processing means further includes operand characterization means for identifying the source of an operand, means for generating a fifth control signal that enables the transfer of information in said addressable register means to said register storage means, and means for generating a sixth control signal upon completion of decoding an instruction, and wherein said control means further includes:

i. register transfer control means responsive to said first and fifth control signals for transferring operands located in said addressable register means to said register storage means of said operands means, and ii. means responsive to said operand characterization means and said sixth control signal for advancing the execution of operands by said special processing means when at least one operand is characterized as being located in said addressable register means.

* * * * *